(12) United States Patent
Lee

(10) Patent No.: US 9,854,278 B2
(45) Date of Patent: Dec. 26, 2017

(54) ANTENA ARRANGEMENTS AND ASSOCIATED CONTROL METHODS

(71) Applicant: SAMSUNG ELECTRONICS CO., LTD., Suwon-si (KR)

(72) Inventor: Dong-Hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/152,977

(22) Filed: May 12, 2016

(65) Prior Publication Data

US 2016/0337677 A1 Nov. 17, 2016

(30) Foreign Application Priority Data

May 12, 2015 (KR) ........................ 10-2015-0066087

(51) Int. Cl.
*H04N 21/2343* (2011.01)
*H04N 21/4402* (2011.01)
*H04N 21/24* (2011.01)
*H01Q 3/26* (2006.01)
*H04B 7/02* (2017.01)
*H04B 7/06* (2006.01)
*H04B 7/0456* (2017.01)
*H04B 7/04* (2017.01)

(52) U.S. Cl.
CPC ....... *H04N 21/234354* (2013.01); *H01Q 3/26* (2013.01); *H04B 7/02* (2013.01); *H04B 7/0456* (2013.01); *H04B 7/0634* (2013.01); *H04B 7/0684* (2013.01); *H04N 21/24* (2013.01); *H04N 21/440254* (2013.01)

(58) Field of Classification Search
None
See application file for complete search history.

(56) References Cited

U.S. PATENT DOCUMENTS

| 2003/0134610 A1* | 7/2003 | DiCamillo | ................ H03L 7/22 455/259 |
| 2008/0219375 A1* | 9/2008 | Yun | ...................... H04B 7/0413 375/267 |
| 2009/0086866 A1* | 4/2009 | Boppana | ............. H04L 27/2647 375/350 |

(Continued)

FOREIGN PATENT DOCUMENTS

| KR | 10-0487304 B1 | 5/2005 |
| KR | 10-2010-0046304 A | 5/2010 |

*Primary Examiner* — Hoang-Vu A Nguyen-Ba
(74) *Attorney, Agent, or Firm* — Sughrue Mion, PLLC

(57) ABSTRACT

A broadcast receiving apparatus includes: a plurality of unit antennas arranged at preset intervals, each unit antenna of the plurality of antennas being configured to receive a broadcast signal; a plurality of receiving modules, each receiving module of the plurality of receiving modules being configured to convert the broadcast signal received by a corresponding unit antenna of the plurality of unit antennas into a first signal and output the first signal; a filter configured to filter a noise component out of the first signals output by the plurality of receiving modules, synthesize the first signals into a second signal and output the second signal; and a signal processor configured to perform a signal process for displaying an image based on the second signal output from the filter.

16 Claims, 20 Drawing Sheets

(56) References Cited

U.S. PATENT DOCUMENTS

| | | | | |
|---|---|---|---|---|
| 2009/0103673 A1* | 4/2009 | Lin | ........................ | H03F 3/211 |
| | | | | 375/371 |
| 2011/0080526 A1* | 4/2011 | Yang | ................... | H04L 25/0212 |
| | | | | 348/725 |
| 2011/0269395 A1* | 11/2011 | Larsson | ............... | H04B 7/0617 |
| | | | | 455/7 |
| 2015/0236811 A1* | 8/2015 | Akita | ........................ | H04K 3/65 |
| | | | | 455/1 |
| 2015/0268326 A1* | 9/2015 | Sung | ........................ | G01S 5/02 |
| | | | | 455/456.3 |
| 2017/0013287 A1* | 1/2017 | Rothaus | ............. | H04N 21/2385 |

* cited by examiner

ANTENA ARRANGEMENTS AND ASSOCIATED CONTROL METHODS

CROSS-REFERENCE TO RELATED APPLICATION

This application claims priority from Korean Patent Application No. 10-2015-0066087 filed on May 12, 2015 in the Korean Intellectual Property Office, the disclosure of which is incorporated herein by reference in its entirety.

BACKGROUND

Field

Apparatuses and methods consistent with the exemplary embodiments relate to a broadcast receiving apparatus, which receives a radio frequency (RF) signal through an antenna and processes the RF signal to be displayed as an image, and a control method thereof, and more particularly to a broadcast receiving apparatus, which has an improved structure in quality of receiving an RF signal even though an circumstance where an antenna is set up is poor to receive the RF signal, and a control method thereof.

Description of the Related Art

An image processing apparatus processes a video signal or video data in accordance with various video processing processes. The image processing apparatus may display an image based on the processed video data on its own display panel, or output the processed video signal to another broadcast receiving apparatus provided with a panel so that on the corresponding broadcast receiving apparatus can display an image based on the processed video signal. That is, the image processing apparatus may include the panel capable of displaying an image or include no panel as long as it can process the video data. For example, the former may include a television (TV), and the latter may include a set-top box. Among these image processing apparatuses, an apparatus for receiving a broadcast signal from a transmitter of a broadcasting station and processing it to be displayed as a broadcast image will be called a broadcast receiving apparatus. The image processing apparatus is also called an image receiving apparatus in terms of receiving an image signal, and in particular called a broadcast receiving apparatus if it has a function of receiving a broadcast signal and displays a broadcast program.

The broadcast receiving apparatus or the image receiving apparatus may receive an image signal by a wired method or a wireless method. In contrast to the wired method of using a cable to receive an image signal, the wireless method involves the image receiving apparatus utilizing an antenna to receive an RF signal, i.e., an image signal. For example, the image receiving apparatus receives a broadcast signal from a transmitter of a broadcasting station through the antenna and processes the broadcast signal, thereby displaying a broadcast image.

In the image processing apparatus which receives the RF signal through the antenna, the antenna may be required to have high reception or accuracy in order to guarantee the quality of the displayed image. The easiest way to improve the reception of the RF signal by the antenna is to set up the antenna in a good location for receiving the RF signal. In other words, it is possible to improve the reception of the RF signal by setting up the antenna in an outdoor area where a signal strength is high.

However, not all antennas can be set up outdoors. In some cases, there may be no choice but to set up the antenna in an indoor area or the like where a signal strength is low. Although the antenna can be set up in the outdoor area, another antenna may have to be additionally set up in the indoor area in accordance with the characteristics of the RF signal. In this case, the reception of the antenna for receiving the RF signal is worsened by interference of a wall, a window or the like. Therefore, in order to guarantee the quality of the image processed by the image receiving apparatus when the antenna is set up where the signal strength is low, there is a need of a method of overcoming the foregoing limits to setup circumstances and improving the reception of the antenna for receiving the RF signal.

SUMMARY

According to an aspect of an exemplary embodiment, there is provided a broadcast receiving apparatus including: a plurality of unit antennas arranged at preset intervals, each unit antenna of the plurality of antennas being configured to receive a broadcast signal; a plurality of receiving modules, each receiving module of the plurality of receiving modules being configured to convert the broadcast signal received by a corresponding unit antenna of the plurality of unit antennas into a first signal and output the first signal; a filter configured to filter a noise component out of the first signals output by the plurality of receiving modules, synthesize the first signals into a second signal and output the second signal; and a signal processor configured to perform a signal process for displaying an image based on the second signal output from the filter. Thus, it is possible to filter a noise component out of the broadcast signals respectively received in the unit antennas, and it is possible to improve the quality of the broadcast signal for an image process.

A maximum distance between two unit antennas among the plurality of unit antennas may be shorter than a half wavelength of the broadcast signal. Thus, the correlation between the broadcast signal components of the broadcast signals respectively received in the plurality of unit antennas is raised, and the receiving sensitivity is improved in terms of the whole plurality of unit antennas.

The receiving module may convert the broadcast signal into the first signal by shifting the broadcast signal received in the unit antenna from a high frequency band into an intermediate frequency band. Here, the receiving module may include a radio frequency integrated circuit (RFIC). Thus, the frequency shift is performed by the oscillator in each receiving module, and thus the correlation between the noise components included in the first signals output from the respective receiving modules is lowered. Thus, it is possible for the filter to filter out the noise component.

The first signal may include a broadcast signal component and the noise component, and the filter may pass the broadcast signal components having relatively high correlation but remove the noise component having relatively low correlation by comparison between the first signals. Further, the filter may include an adaptive filter. Thus, the broadcast signal component is included while the noise component is excluded when the second signal is obtained from the first signals transmitted from the respective receiving modules.

The broadcast receiving apparatus may further include: a second antenna group including at least one unit antenna and spaced apart from a first antenna group including the plurality of unit antennas; and a signal synthesizer configured to synthesize second signals corresponding to the first antenna group and the second antenna group into a third signal and transmit the third signal to the signal processor. Here, a minimum distance between the first antenna group and the second antenna group may be longer than a half wavelength of the broadcast signal. Thus, both the antenna diversity and the receiving sensitivity are improved to thereby receive a broadcast signal with high definition.

The first antenna group may be installed at a location where a receiving electric field is weaker than that of a place for the second antenna group. Thus, although the two antenna groups are respectively installed outdoors and indoors, which are significantly different in terms of the receiving electric field strength, it is possible to receive the broadcast signal with high reception from the broadcast signals received in the two antenna groups.

According to an aspect of another exemplary embodiment, there is provided a broadcast receiving apparatus including: a single antenna configured to receive a broadcast signal; a plurality of receiving modules configured to convert the broadcast signal branched and output from the single antenna into first signals; a filter configured to filter a noise component out of the first signals received from the plurality of receiving modules and synthesize the first signals into a second signal, and output the second signal; and a signal processor configured to perform a signal process for displaying an image based on the second signal output from the filter. This, it is possible to filter the noise component out of the broadcast signal received in the single antenna, and it is possible to improve the quality of the broadcast signal for an image process.

According to an aspect of another exemplary embodiment, there is provided a method of controlling a broadcast receiving apparatus, the method including: receiving a broadcast signal through a plurality of unit antennas arranged at preset intervals; converting, by a plurality of receiving modules respectively corresponding to the plurality of unit antennas, the broadcast signal received in the plurality of unit antennas into first signals; filtering, by a filter, a noise component out of the first signals and synthesizing the first signals into a second signal; and displaying an image by processing the second signal output. Thus, it is possible to filter the noise component out of the broadcast signals respectively received in the unit antennas, and it is possible to improve the quality of the broadcast signal for an image process.

A maximum distance between two unit antennas among the plurality of unit antennas is shorter than a half wavelength of the broadcast signal. Thus, the correlation between the broadcast signal components of the broadcast signals respectively received in the plurality of unit antennas is raised, and the receiving sensitivity is improved in terms of the whole plurality of unit antennas.

The converting the broadcast signals into the first signals respectively may include converting the broadcast signal into the first signal by shifting the broadcast signal received in the unit antenna from a high frequency band into an intermediate frequency band. Here, the receiving module may include a radio frequency integrated circuit (RFIC). Thus, the frequency shift is performed by the oscillator in each receiving module, and thus the correlation between the noise components included in the first signals output from the respective receiving modules is lowered. Thus, it is possible for the filter to filter out the noise component.

The first signal may include a broadcast signal component and the noise component, and the synthesizing the first signals into the second signal may include acquiring the broadcast signal components having relatively high correlation but removing the noise component having relatively low correlation by comparison between the first signals. Further, the filter may include an adaptive filter. Thus, the broadcast signal component is included excluding the noise component when the second signal is obtained from the first signals transmitted from the respective receiving modules.

A second antenna group may include at least one unit antenna and be spaced apart from a first antenna group including the plurality of unit antennas, wherein displaying the image includes displaying an image based on a third signal obtained by synthesizing the second signals respectively output from the first antenna group and the second antenna group. Here, a minimum distance between the first antenna group and the second antenna group may be longer than a half wavelength of the broadcast signal. Thus, both the antenna diversity and the receiving sensitivity are improved to thereby receive a broadcast signal with high definition.

The first antenna group may be installed at a place where a receiving electric field is weaker than that of a place for the second antenna group. Thus, although the antenna groups are respectively installed outdoors and indoors, which are significantly different in the receiving electric field strength from each other, it is possible to acquire the broadcast signal with high reception from the broadcast signals received in the two antenna groups.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Further, the exemplary embodiments will describe only elements directly related to the idea of the invention, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
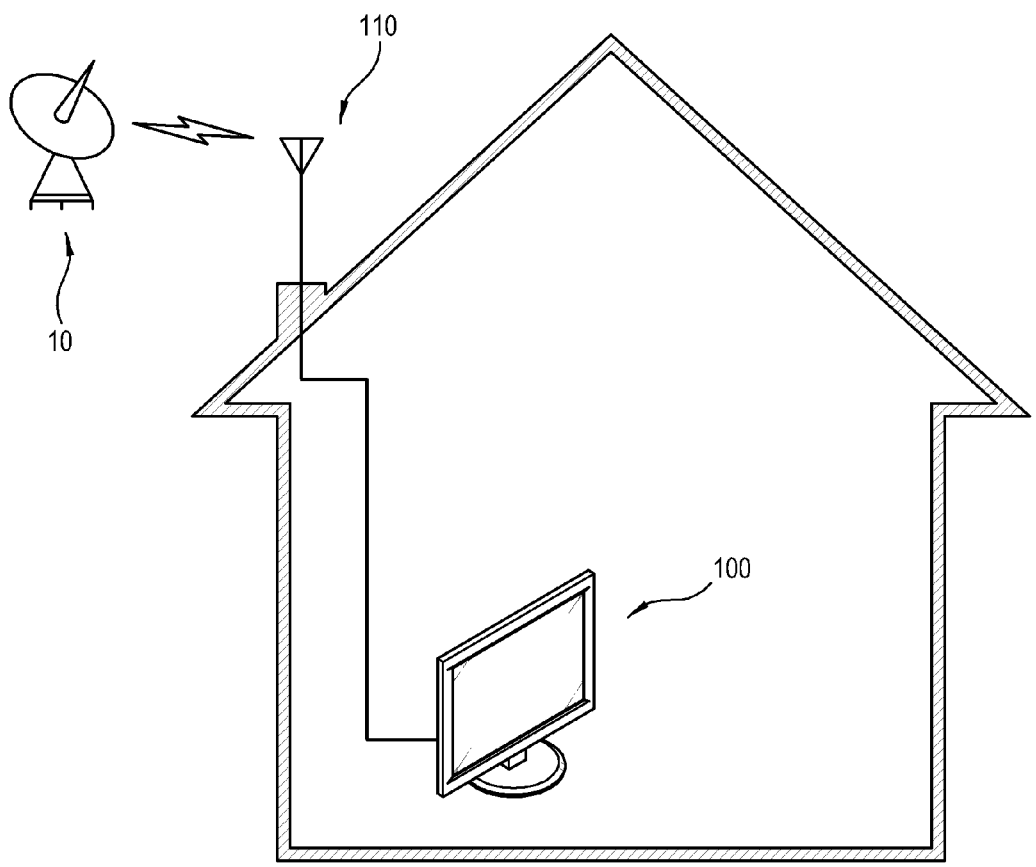
FIG. 1 illustrates an antenna set up in an image receiving apparatus according to a first exemplary embodiment.

FIG. 1 illustrates an antenna 110 set up in an image receiving apparatus 100 according to a first exemplary embodiment;

As shown in FIG. 1, the image receiving apparatus 100 according to this exemplary embodiment wirelessly receives an image signal from a transmitter 10 of a broadcasting station and the like. In this exemplary, the image signal is a radio frequency (RF) signal, e.g., a broadcast signal transmitted from the transmitter 10. However, the present inventive concept is not limited to this case where a sender is the transmitter 10 and the image signal is the broadcast signal. Alternatively, the present inventive concept may be broadly applied to a case where various transmitting apparatuses transmit image signals in the form of RF signals.

The image receiving apparatus 100 may be achieved variously. For example, the image receiving apparatus 100 may be a television (TV) that displays a broadcast image, or a set-top box that outputs a processed broadcast signal to an external display apparatus so that the external display apparatus can display a broadcast image. Alternatively, the image receiving apparatus 100 may be a relay that relays a broadcast signal to another apparatus.

The image receiving apparatus 100 may use various methods to receive a broadcast signal. In this embodiment, the image receiving apparatus 100 wirelessly receives a broadcast signal through a radio frequency (RF) antenna 110. The image receiving apparatus 100 is tuned to a broadcast signal received through the antenna 110, converts the broadcast signal into a digital signal, and shifts it to a baseband to undergo demultiplexing and decoding, thereby processing a broadcast image to be displayed.

The antenna 110 is a kind of converter for transmitting or receiving an electromagnetic wave of a certain frequency band, in which an electromagnetic wave of a radio frequency (RF) band is converted into an electric signal or the electric signal is converted in to the electromagnetic wave. The antenna 110 is an array of electric conductors that emits an electromagnetic field generated when a certain voltage is applied together with modified electric current. Therefore, the transmitting/receiving performance of the antenna 110 is closely related with an electric field of an circumstance where the antennal 110 is installed.

The quality of a broadcast image displayed by the image receiving apparatus 100 depends on many parameters. Among them, a particularly important parameter in the case of a terrestrial broadcast is the reception of the broadcast signal. To improve the reception of the broadcast signal, the antenna 110 has to be installed in an circumstance where a receiving electric field is high. Therefore, the antenna 110 is usually installed at a rooftop or the like outside where there is little interference with other building structures.

Additionally, in accordance with circumstances where the image receiving apparatus 100 and the antenna 110 are installed, it may be difficult to install the antenna 110 outdoors, or it may be difficult to connect a lead wire of the antenna 110 to the image receiving apparatus 100 installed indoors even though the antenna 110 is installed outdoors. In these cases, the antenna 110 is installed indoors.

Figure 2:
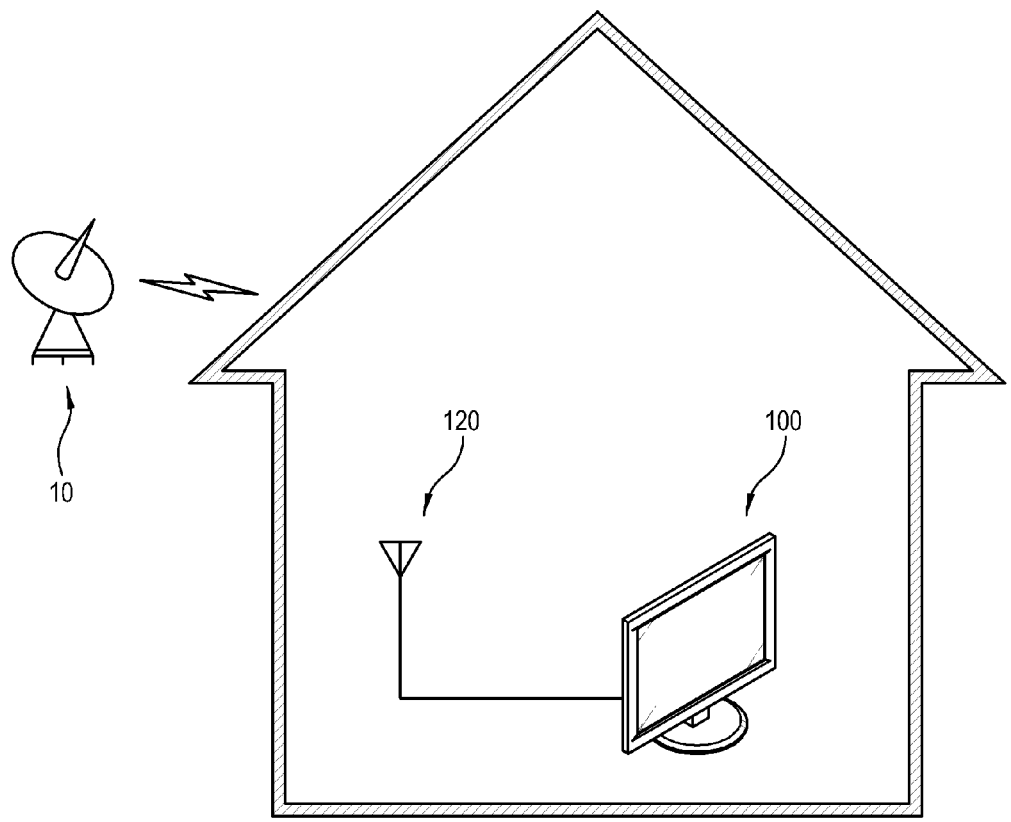
FIG. 2 illustrates an antenna set up in an image receiving apparatus according to a second exemplary embodiment.

FIG. 2 illustrates an antenna 120 set up in an image receiving apparatus 100 according to a second exemplary embodiment.

As shown in FIG. 2, the image receiving apparatus 100 connects with the antenna 120 installed indoors. The antenna 120 receives a broadcast signal from the transmitter 10 and transmits it to the image receiving apparatus 100.

By the way, the broadcast signal from the transmitter 10 is interfered with a wall, a window or the like structure until reaching the antenna 120. Since an indoor receiving electric field is lower than an outdoor receiving electric field by not less than 10 dB, the reception of the indoor antenna 120 is significantly lower than that of the outdoor antenna. In result, a broadcast image displayed by processing the broadcast signal received in the indoor antenna 120 has a low quality.

For this reason, an active antenna may be used as the indoor antenna 120. The active antenna is an antenna for a small television (TV) and is focused on directionality. The active antenna is designed placing emphasis on directionality rather than efficiency with respect to noise in case of a city or the like region where an electric field is relatively strong. Thus, the active antenna is achieved by an antenna that includes a built-in low noise amplifier to have a minimum value within an allowable range of a signal to noise ratio (SNR). The active antenna is manufactured by combining a loop antenna having a directional gain of about 3 dB with an active device such as a transistor, a tunnel diode, a varactor, etc.

Although the active antenna is used as the indoor antenna 120, a noise figure of a preamplifier is currently limited to 4 dB to 5 dB. Therefore, to improve the reception of the indoor antenna 120 up to that of the outdoor antenna 110 (refer to FIG. 1), a plurality of antennas 120 may be installed inside of a building.

Figure 3:
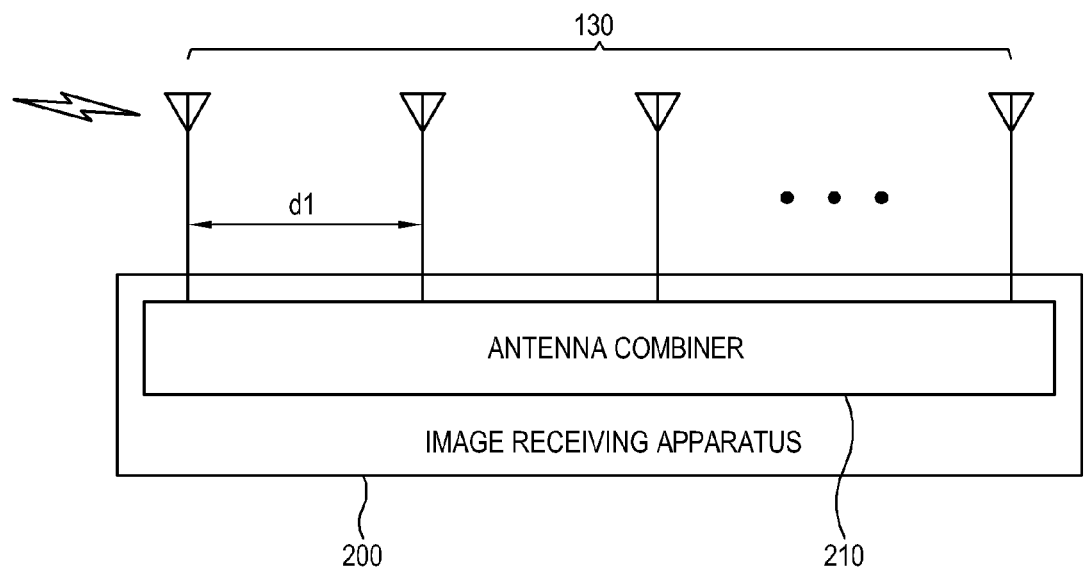
FIG. 3 illustrates an antenna set up in an image receiving apparatus according to a third exemplary embodiment.

FIG. 3 illustrates an antenna 130 set up in an image receiving apparatus 200 according to a third exemplary embodiment.

As shown in FIG. 3, the image receiving apparatus 200 includes a plurality of antennas 130 to receive an RF signal.

The image receiving apparatus 200 includes an antenna combining section 210 to process RF signals respectively received from the plurality of antennas 130, and outputs the RF signal of high reception.

Multiple-input multiple-output (MIMO) is a smart antenna technology that uses a plurality of antennas to increase the capacity of wireless communications. MIMO uses a plurality of antennas for each of a transmitter and a receiver, and increases the capacity in proportion to the number of used antennas. For example, if M antennas are installed at the receiver and N antennas are installed at the transmitter, an average transmission capacity is generally increased as much as min(N, M). In the case of M=1 and the plurality of antennas used for only the transmitter, it will be called multiple-input single-output (MISO). In the case of N=1 and the plurality of antennas used for only the receiver, it will be called single-input multiple-output (SIMO). In the case of (N, M)=(1, 1), it will be called single-input single-output (SISO). According to this exemplary embodiment, the plurality of antennas 130 are used for the receiver like the MIMO and SIMO technologies.

The reason why the MIMO technology is used is because an antenna diversity effect and a spatial multiplexing effect are maximized. Below, concepts of the diversity and the spatial multiplexing will be described in brief.

The diversity method is utilized for lessening effects from fading occurrence such as irregular change in the receiving electric field under RF circumstances. Since copies of a signal differently transmitted in time, frequency and space domains are different from one another, the diversity method synthesizes them to lessen the fading effects and then receives and processes the signal. The diversity method includes a space diversity method, a polarization diversity method, a frequency diversity method, and a time diversity method.

The fading refers to the fact that an amplitude, a phase and the like of a signal are irregularly changed as two or more electromagnetic waves different in path interfere with each other. The interference includes constructive interference and destructive interference.

In the case of the space diversity, two or more antennas which are spatially separated and respectively installed at positions with the minimum fading correlation, and the best signal is selectively, thereby lessening the fading effects. The antenna diversity method includes space diversity method.

The meaning of the correlation is as follows. If there is a relationship, intensity of the relationship, directionality of relationship, dependency or the like between two factors such as signals, functions, random variables, phenomena, etc., it will be called correlation or similarity between these two factors. The correlation may be expressed and measured by a scatter diagram, covariance, a correlation coefficient, a correlation function, etc. The scatter diagram shows how widely observed data are scattered from the center, and represents the correlation in the form of a geometrical figure. The covariance is a yardstick of the correlation about a direction and degree of linear dependency between variables. The correlation coefficient is a normalized yardstick of correlation evaluation, and is a standard for evaluating reliance and dependence between two random variables. That is, the correlation coefficient is a criterion normalized for quantitative comparison in correlation between two variables.

The polarization diversity method lessens the fading effects by individually transmitting two polarizations, a vertical polarization and a horizontal polarization, based on a principle that the fading is varied depending on the polarizations.

The frequency diversity method is based on a principle that a fading correlation is decreased as a frequency interval between two or more frequencies becomes larger since different frequencies make a change in a fading effect of the receiving electric field.

The time diversity method is achieved by repetitively sending the same information leaving a time lag.

The spatial multiplexing is a method in which multiple spatially separated channels in not a time or frequency domain but a space domain are transmitted by one logical channel, and thus a plurality of information streams are separated into a plurality of spatial streams and transmitted through a plurality of antennas. In the spatial multiplexing, a signal having a large amount of information is divided into many spatial streams and then transmitted at once, and different individual signals are transmitted through many spatial paths at once. Thus, it is possible to increase channel capacity without enlarging a frequency bandwidth and raising transmission power.

According to this exemplary embodiment, the following structure is used to heighten the effects of the antenna diversity.

The plurality of antennas 130 are installed in such a manner that a distance d1 between the respective antennas 130 is equal to or longer than $\lambda/2$. Here, $\lambda$ is a wavelength of a received RF signal. If d1 is set like this, the RF signals respectively received in the antennas 130 are different in phase change from one another and thus have a low correlation therebetween. This means that the respective signals are independent of one another in terms of multiple-path fading. The multiple-path fading is a phenomenon that electromagnetic waves received along different paths are reflected from many objects and thus irregularly fluctuate due to interference between their different amplitudes, phases, incident angles, polarizations, etc.

If the signals are independent of one another, one signal is less likely to undergo deep fading even though another signal experiences deep fading. Therefore, it is possible to get a signal with less multi-path fading by combining two independent signals. This is a method of increasing transmission reliability by a diversity gain. Based on this method, the antenna combining section 210 processes the RF signals respectively received from the antennas 130 to thereby get a RF signal of high quality.

According to an exemplary embodiment, the distances between the plurality of antennas 130 are equal to or longer than $\lambda/2$, and thus the effect of the antenna diversity is improved, thereby resulting in getting a signal with less fading.

However, if the respective antennas 130 have to be spaced apart by a distance not shorter than $\lambda/2$, the plurality of antennas 130 occupies much space. Although the plurality of antennas 130 are installed, it is not easy to improve the effect of the antenna diversity to such an extent as to get a signal with less fading approximate to that of a signal received in the external antenna.

Further, the method according to this exemplary embodiment makes the distance between the antennas 130 be longer as a frequency becomes lower, and therefore the antenna diversity gain may be decreased.

Similar to the signal reception being raised by lessening the fading when the antennas 130 are installed indoors, there is a need of raising the signal reception up to that of the outdoor antenna even when the antennas 130 respectively installed both indoors and outdoors are combined. If the signal reception of the indoor antenna 130 is significantly different from that of the outdoor antenna, for example, or if the signal reception of the indoor antenna 130 is much lower than that of the outdoor antenna, it is not easy to synthesize two signals respectively received from the indoor and outdoor antennas.

To minimize this problem, a fourth exemplary embodiment will be described below.

Figure 4:
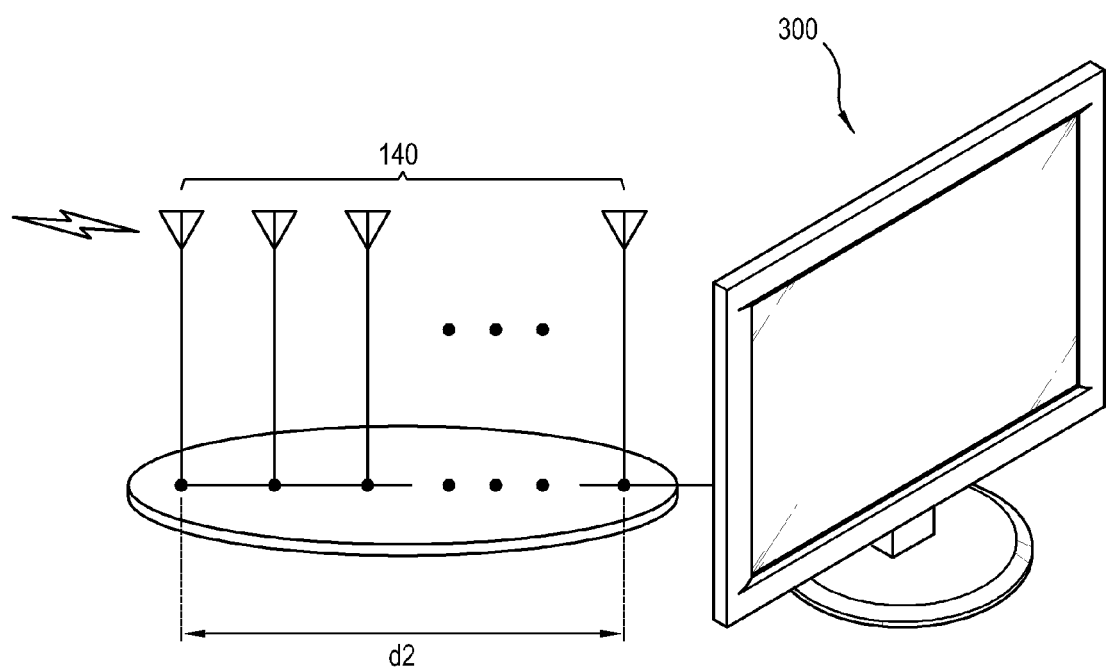
FIG. 4 illustrates an antenna set up in an image receiving apparatus according to a fourth exemplary embodiment.

FIG. 4 illustrates an antenna 140 set up in an image receiving apparatus 300 according to the fourth exemplary embodiment.

As shown in FIG. 4, the image receiving apparatus 300 according to the fourth exemplary embodiment includes a plurality of antennas 140 to receive an RF signal. Similarly to the third exemplary embodiment, the plurality of antennas 140 is installed indoors or the like circumstances where the receiving electric field is low. However, in contrast to the third exemplary embodiment, two antennas 140 farthest away from each other among the plurality of antennas 140 are installed so that a distance d2 between them can be shorter than λ/2. Here, λ is a wavelength of the received RF signal. In other words, the plurality of antennas 140 are installed within a circle having the diameter d2 shorter than λ/2.

It will be naturally appreciated that the effect of the antenna diversity is drastically decreased when the plurality of antennas 140 is arranged within the foregoing circle. The distance d1 longer than λ/2 (see FIG. 3) in the third exemplary embodiment is to raise the reliability of the synthesized signal by lowering the correlation and increasing the independency between the signals received in the respective antennas and thus securing the diversity gain.

However, if all the antennas 140 are placed within a range of λ/2 according to this exemplary embodiment, the correlation increases but the degree of independence is lowered between the signals received in the respective antennas 140. In this case, if a signal received in one antenna 140 experiences the deep fading, signals received in the other antenna 140 are also likely to experience the deep fading. In this case, even if the signals respectively received in the plurality of antennas 140 are synthesized, the synthesized signal is likely to be characterized by deep fading. In such a case where the plurality of antennas 140 is densely arranged, it is difficult to achieve the antenna diversity effect. In this exemplary embodiment, a hardware structure is added to the image receiving apparatus 300 in order to raise the receiving sensitivity of the RF signal, and details will be described later.

Below, the image receiving apparatus 300 will be described with reference to FIG. 5.

Figure 5:
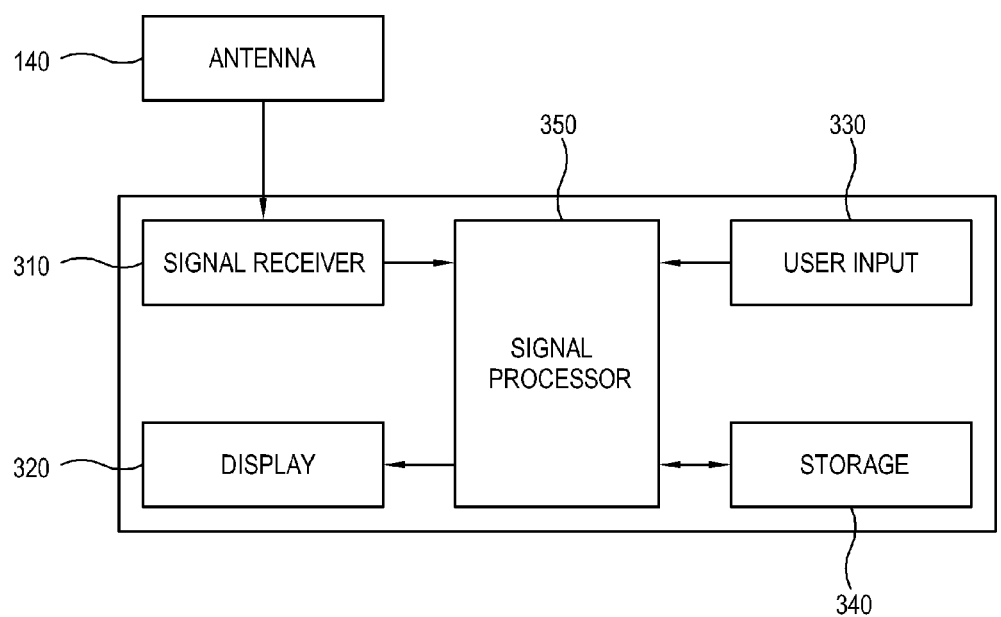
FIG. 5 is a block diagram of the image receiving apparatus of FIG. 4.

FIG. 5 is a block diagram of the image receiving apparatus 300

As shown in FIG. 5, the image receiving apparatus 300 according to this exemplary embodiment is a TV capable of receiving, processing and displaying a broadcast signal by itself. However, the present inventive concept is applicable to any devices that can receive the RF signal, and thus the image receiving apparatus 300 may be achieved by an image processing apparatus that cannot display an image by itself like a set-top box or by a relay that receives a broadcast signal and delivers it to another device. Further, the antenna 140 connected to the image receiving apparatus 300 is not a single antenna but a multiple antenna including a plurality of antennas.

The image receiving apparatus 300 includes a signal receiver 310 that receives a RF broadcast signal received in the antenna 140, a display 320 that displays an image based on the broadcast signal received in the signal receiver 310, a user input 330 that receives a user's input, a storage 340 that stores data/information, and a signal processor 350 that controls general operations of the image receiving apparatus 300 and processes data.

The signal receiver 310 receives a broadcast signal through the antenna 140 and transmits it to the signal processor 350. The signal receiver 310 may be tuned to a certain channel for receiving the broadcast signal and transmit the received broadcast signal to the signal processor 350. The signal receiver 310 is not limited to receiving the broadcast signal through the antenna 140, and may interactively communicate with the exterior. The signal receiver 310 may be achieved by an assembly of connection ports or connection modules corresponding to communication standards, and its supportable protocols and communication targets are not limited to one kind or type. For example, the signal receiver 110 may include a Wi-Fi communication module for wireless communication, an Ethernet module for wired communication, and a universal serial bus (USB) port for local connection with a USB memory or the like as well as the antenna 140 for receiving an RF signal.

The display 320 displays an image based on an image signal processed by the signal processor 350. For example, the display 320 displays a broadcast image based on the tuned broadcast signal output from the signal processor 350. There are no limits to the types of the display 320. For example, the display 120 may be achieved by various display types such as liquid crystal, plasma, a light-emitting diode, an organic light-emitting diode, a surface-conduction electron emitter, a carbon nano-tube, nano-crystal, etc.

The display 320 may include additional elements in accordance with the types of the panel. For example, if the display 320 is achieved by the liquid crystal, the display 130 includes a liquid crystal display (LCD) panel, a backlight unit for supplying light to the LCD panel, and a panel driving substrate for driving the LCD panel.

The user input 330 transmits various preset control commands or information to the signal processor 350 in accordance with a user's control or input. The user input 330 transmits signals corresponding to various events, which occur by a user's control in accordance with a user's intention, to the signal processor 350. The input unit 330 may be variously achieved in accordance with information input methods. For example, the input unit 330 may include a key/button provided on an outer side of the image receiving apparatus 300, an additional remote controller separated from the image receiving apparatus 300, a touch screen formed integrally with the display 320, etc.

The storage 340 stores various pieces of data under process and control of the signal processor 350. The storage 340 is accessed by the signal processor 350 and performs reading, writing, editing, deleting, updating or the like with regard to data. The storage 340 is achieved by a flash-memory, a hard-disc drive or the like nonvolatile memory to preserve data regardless of supply of system power in the image receiving apparatus 300.

The signal processor 350 performs various processes with regard to data or signals received in the signal receiver 310. When the broadcast signal is received in the signal receiver 310, the signal processor 350 applies a video processing process to the tuned broadcast signal, and outputs the processed broadcast signal to the display 320, thereby displaying an image on the display 320.

There are no limits to the kind of image processing process performed by the signal processor 160, and the video processing process may for example include demultiplexing for separating a stream into sub streams such as a video signal, an audio signal and additional data, decoding corresponding to video formats of an image stream, de-interlacing for converting an image stream from an interlaced type into a progressive type, scaling for adjusting an image stream to have a preset resolution, noise reduction for improving image quality, detail enhancement, frame refresh rate conversion, etc.

Since the signal processor 350 can perform various processes in accordance with the kinds and characteristics of signal or data, the process performable by the signal processor 350 is not limited to the video processing process. Further, data that can be processed by the signal processor 350 is not limited to only data received in the signal receiver 310. For example, if a user's voice is input to the image receiving apparatus 300, the signal processor 350 may process the voice in accordance with a preset voice recognition processing process. The signal processor 350 is achieved by a system-on-chip (SOC), in which many functions are integrated, or an image processing board where individual chip-sets for independently performing the processes are mounted to a printed circuit board.

The signal processor 350 may perform control so that a broadcast signal corresponding to a frequency of a certain channel can be received and displayed as a broadcast image. If the user input 330 receives a command for selecting a certain channel while the signal receiver 310 receives the broadcast signal, the signal processor 350 acquires a tuning frequency of the selected channel. Then, the signal processor 350 performs control to process the broadcast signal corresponding to the selected frequency and display a broadcast image based on the processed broadcast signal through the display 320.

Below, details of the signal processor 350 will be described with reference to FIG. 6.

Figure 6:
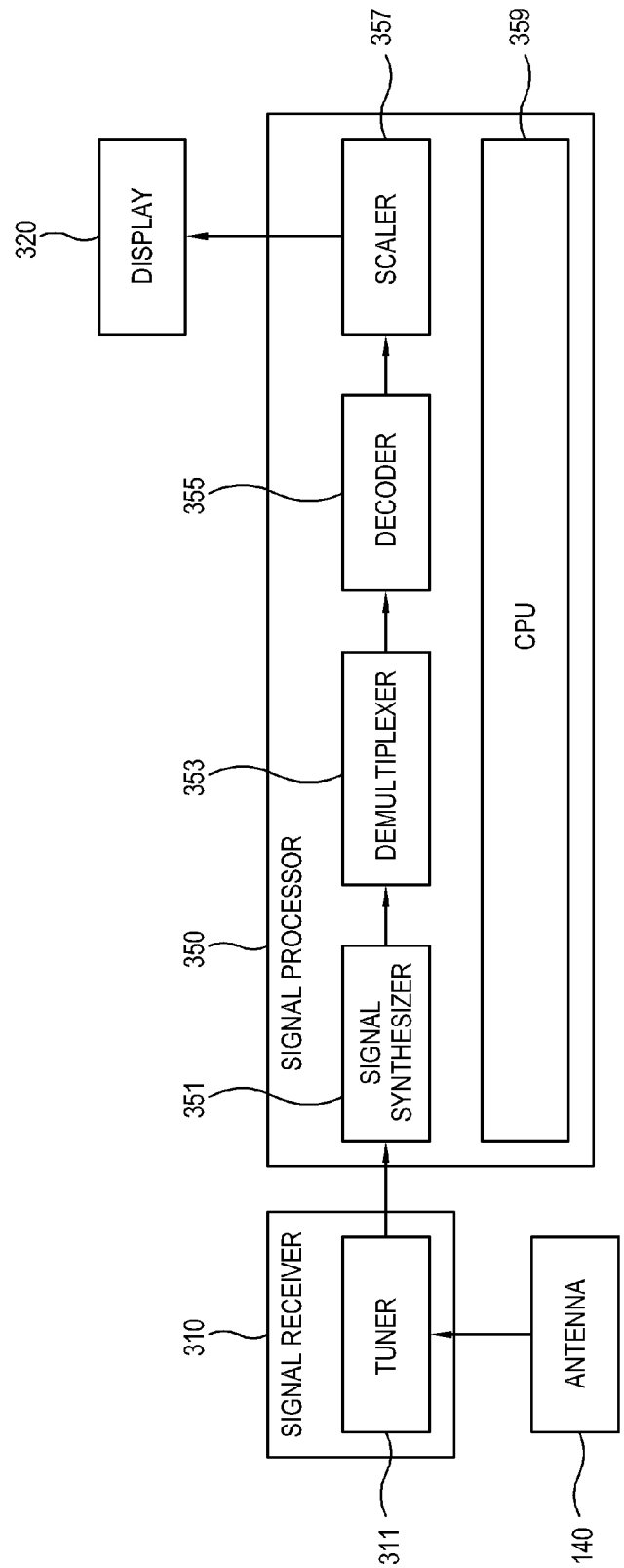
FIG. 6 is a block diagram of a signal processor in the image receiving apparatus of FIG. 4.

FIG. 6 is a block diagram of the signal processor 350. FIG. 6 shows only basic elements of the signal processor 350, and an actual product of the signal processor 350 includes additional elements besides the elements described below.

As shown in FIG. 6, the signal receiver 310 includes a tuner 311 to be tuned to a certain frequency to receive a broadcast signal. Further, the signal processor 350 includes a signal synthesizer 351 for synthesizing broadcast signals received from the tuner 311 of the signal receiver 310 and respectively corresponding to the antennas 140, a demultiplexer 353 for dividing the synthesized signal from the signal synthesizer 351 into a plurality of sub signals, a decoder 355 for decoding the sub signals output from the demultiplexer 353, a scaler 357 for scaling a video signal among the decoded sub signals and outputting it to the display 320, and a central processing unit (CPU) 359 for performing calculation and control for the operations of the signal processor 350.

Referring to FIG. 6, the signal synthesizer 351 belongs to the signal processor 350, but this is given only for the illustrative purposes. Alternatively, the signal synthesizer 351 may belong to the signal receiver 310 as long as the signal synthesizer 351 serves to synthesize signals respectively received in the antenna 140 and get a broadcast signal with improved reception quality. Details of the signal synthesizer 351 will be described later.

When a broadcast signal is received in the antenna 140, the tuner 311 is tuned to a frequency of a designated channel to receive a broadcast signal and converts the broadcast signal into a transport stream. The tuner 311 converts a high frequency of a carrier wave received via the antenna 140 into an intermediate frequency band and converts it into a digital signal, thereby generating a transport stream. To this end, the tuner 311 has an analog/digital (A/D) converter. Alternatively, the A/D converter may be designed to be included in not the tuner 311 but a demodulator.

The demultiplexer 353 performs a reverse operation of the multiplexer. That is, the demultiplexer 353 connects one input terminal with a plurality of output terminals, and distributes a stream input to the input terminal to the respective output terminals in accordance with selection signals. For example, if there are four output terminals with respect to one input terminal, the demultiplexer 353 may select each of the four output terminals by combination of selection signals having two level of 0 and 1.

In the case where the demultiplexer 353 is applied to the image receiving apparatus 300, the demultiplexer 353 divides the transport stream received from the tuner 311 into the sub signals of a video stream, an audio stream and an additional data stream and outputs them to the respective output terminals.

The demultiplexer 353 may use various methods to divide the transport stream into the sub signals. For example, the demultiplexer 353 divides the transport stream into the sub signals in accordance with packet identifiers (PID) given to packets in the transport stream. The sub signals in the transport stream are independently compressed and packetized according to channels, and the same PID is given to the packets corresponding to one channel so as to be distinguished from the packets corresponding to another channel. The demultiplexer 353 classifies the packets in the transport stream according to the PID, and extracts the sub signals having the same PID.

The decoder 355 decodes each of the sub signals output from the demultiplexer 353. In this exemplary embodiment, one decoder 355 is illustrated, but not limited thereto. Alternatively, a plurality of decoders 355 may be provided to decode the sub signals respectively. That is, the decoder 355 may include a video decoder for decoding a video signal, an audio decoder for decoding an audio signal, and a data decoder for decoding additional data.

Since the sub signals transmitted to the decoder 355 are encoded by a certain format, the decoder 355 performs a decoding process to return the sub signal to a state before an encoding process by performing an opposite process to the encoding process with regard to the sub signal. Therefore, if the sub signal output from the demultiplexer 353 is not encoded, i.e. not compressed, this sub signal is transmitted to the scaler 357 without undergoing the process of the decoder 355 or is transmitted to the scaler 357 by bypassing the decoder 355.

The scaler 357 scales the decoded video signal in accordance with the resolution of the display 320 or a separately designated resolution. After the scaling process, the video signal is displayed on the display 320.

The CPU 359 is an element for performing central calculation to operate general elements in the signal processor 350, and plays a central role in parsing and calculating data. The CPU 359 internally includes a processor register in which commands to be processed are stored; an arithmetic logic unit (ALU) being in charge of comparison, determination and calculation; a control unit for internally controlling the CPU 359 to analyze and carry out the commands; an internal bus, a cache, etc. Further, the CPU 359 externally involves a random access memory (RAM) to which data to be processed is loaded.

With this structure, the signal processor 350 makes a synthesized signal by synthesizing the signals respectively received from the plurality of antennas 140, and processes the synthesized signal to be displayed as a broadcast signal on the display 320.

Below, the signal synthesizer will be described with reference to FIG. 7.

Figure 7:
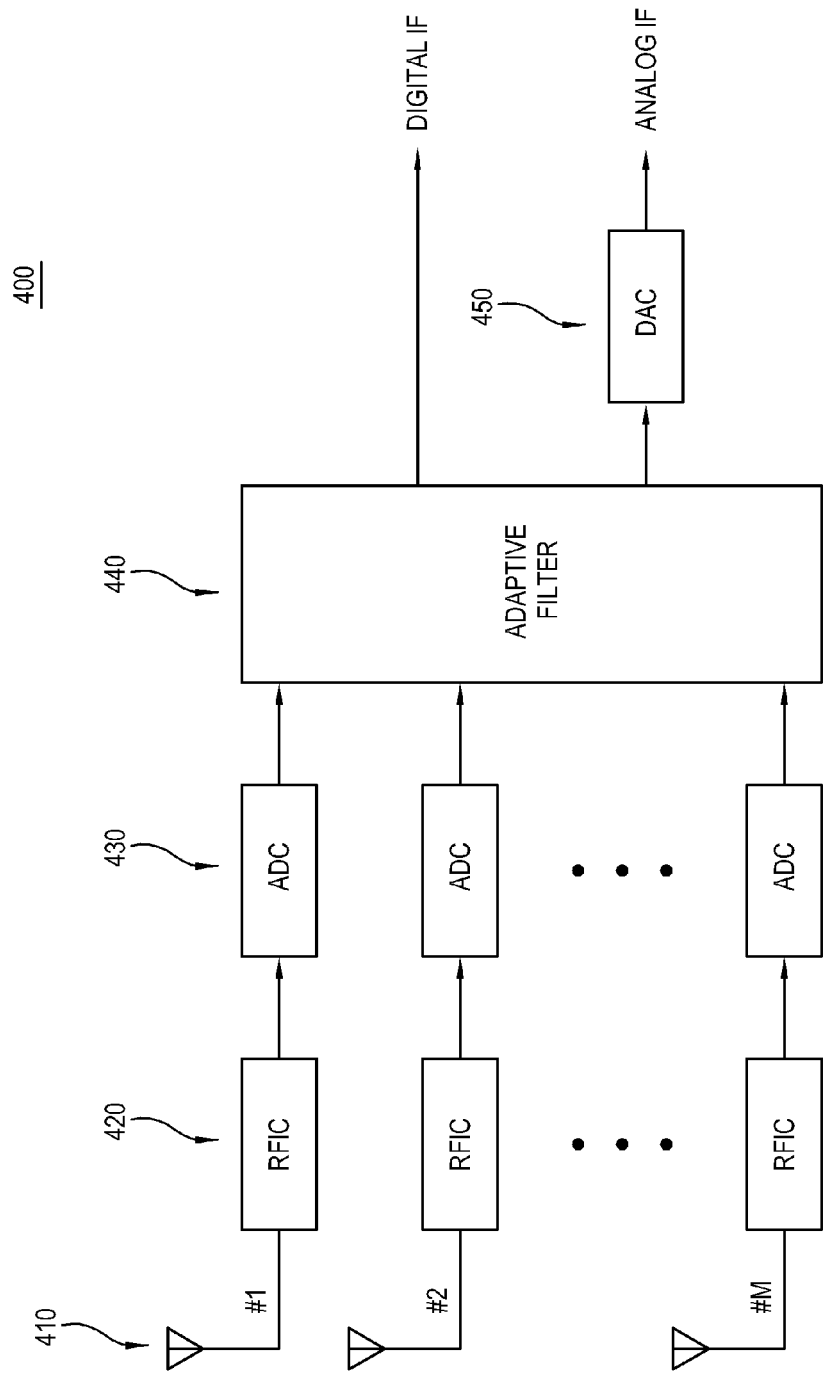
FIG. 7 is a block diagram of a signal synthesizer in the signal processor of FIG. 6.

FIG. 7 is a block diagram of the signal synthesizer.

As shown in FIG. 7, an image receiving apparatus 400 includes a plurality of antennas 410, a plurality of radio frequency integrated circuits (RFICs) 420 for individually receiving a broadcast signal through the respective antennas 410, a plurality of analog-digital converters (ADC) 430 for converting the signals output from the respective RFICs 420 into digital signals, and an adaptive filter 440 for synthesizing the signals output from the plurality of ADCs 430.

The image receiving apparatus 400 shown in FIG. 7 is the same as the image receiving apparatus 300 of FIG. 5 and FIG. 6, the tuner 311 (see FIG. 6) includes the RFIC 420, and the signal synthesizer 351 (see FIG. 6) includes the ADC 430 and the adaptive filter 440. FIG. 7 illustrates that the ADC 430 belongs to the signal synthesizer 351 (see FIG. 6), but is not limited thereto. Alternatively, the ADC 430 may belong to the signal receiver 310 (see FIG. 6) or the tuner 311 (see FIG. 6).

As described above with reference to FIG. 4, the plurality of antennas 410 are installed so that the distance d2 between the two antennas 410 farthest away from each other can be shorter than λ/2. The broadcast signals respectively received in the antennas 410 are transmitted to the RFICs 420 of the antennas 410.

The RFIC 420 is provided in each of the antennas 410 and shifts the broadcast signal received in the antenna 410 from a high frequency band into an intermediate frequency band. If the number of antennas 410 is M, the number of RFIC 420 is also M. The reason why the number of RFICs 420 is equal to the number of antennas 410 will be described later. To shift a frequency, the RFIC 420 includes an oscillator.

The RF approximately ranges from 300 MHz to 30 GHz. In a field of electronic technology, the RFIC 420 generally refers to an integrated circuit designed for wireless communication. The integrated circuit (IC) is a circuit that includes many transistors and various passive components, such as resistors, capacitors and the like, that are integrated together on a semiconductor substrate. The IC may be classified into a small scale IC (SSI), a medium scale IC (MSI), a large scale IC (LSI), etc. in accordance with the number of gates. The RFIC 420 is based on functional classification, and is an IC for receiving an RF signal.

The ADC 430 is an electronic circuit that converts an analog electric signal into a digital electric signal. Since it is harder to store and process an analog signal than a digital signal, the analog signal is converted by the ADC 430 into the digital signal. In general, it is advantageous in terms of noise if an analog signal is converted into a digital signal, but the signal may be distorted during the conversion.

In contrast to the ADC 430, the DAC 450 is an electronic circuit for converting a digital electric signal into an analog electric signal. The DAC 450 performs an opposite process to the process of the ADC 430.

The plurality of RFICs 420 may use the same clocks, but not limited thereto. Alternatively, the plurality of RFICs 420 may use different clocks within an allowable error. Likewise, the plurality of ADC 430 may use the same clocks or may use different clocks within an allowable error. In this exemplary embodiment, a signal input to the ADC 430 has an intermediate frequency, but not limited thereto. Alternatively, the signal input to the ADC 430 may have a high frequency band or a baseband.

The adaptive filter 440 is a linear filter having a transmission function to be controlled by variable parameters and adjusts the parameters in accordance with an optimization algorithm. Due to complexities of the optimization algorithm, the adaptive filter 440 is usually a digital filter. Therefore, the ADC 430 is provided at the front end of the adaptive filter 440. Since some parameters for a required process are not previously known or varied, the adaptive filter 440 is required in some applications or circuits. The closed loop of the adaptive filter employs a feedback in the form of an error signal so as to optimize its transmission function. The closed loop of the adaptive filter includes use of a cost function as a yardstick for an optimum performance of a filter, and thus determines how the transmission function of the filter is adjusted in order to minimize costs at the next turn.

In this exemplary embodiment, the adaptive filter 440 synthesizes input signals received from the respective ADCs 430 and outputs a synthesized signal. During the synthesizing process, the adaptive filter 440 gives weights to respective input signals and then adds them up. Through this process, noise is drastically removed from a result of synthesizing the input signals, and therefore a signal synthesized by and output from the adaptive filter 440 becomes a signal with excellent reception approximate to the quality of a broadcast signal first transmitted from the transmitter.

Such a result in the signal of the adaptive filter 440 is closely related with the installation structures of the antenna 410 and the RFIC 420, and these structures will be described below.

According to the third exemplary embodiment (see FIG. 3), two adjacent antennas among the plurality of antennas 130 (see FIG. 3) are spaced apart from each other at a distance not shorter than a half wavelength of a received signal to thereby raise the effect of the antenna diversity when the received signals are synthesized.

On the other hand, according to this exemplary embodiment, a distance between two antennas farthest away from each other among the plurality of antennas 410 is shorter than the half wavelength of the received signal. In this case, the effect of the antenna diversity is not highly expected on the contrary to that of the third exemplary embodiment. Nevertheless, this exemplary embodiment results in the receiving sensitivity higher than that of only one antenna since the plurality of antennas 410 are densely arranged.

According to the third exemplary embodiment, a signal received in a certain antenna 130 (see FIG. 3) has low correlation with a signal received in another antenna 130 (see FIG. 3). On the other hand, according to the exemplary embodiment of FIG. 7, a signal received in a certain antenna 410 has high correlation with a signal received in another antenna 410. However, in such a case where the plurality of antennas 410 are densely arranged within a narrow area according to this exemplary embodiment, if a certain received signal has high noise, the other signals are likely to have high noise. Therefore, it is difficult to remove noise from the synthesized signal of the received signals.

Thus, according to this exemplary embodiment, the RFICs 420 are respectively provided in the antennas 410, so that the signals respectively received in the antenna 410 can be shifted from a high frequency band into an intermediate frequency band through individual shift processes. Additionally, the frequency shift process of the RFIC 420 needs an oscillating operation of an oscillator, and thus each RFIC 420 includes an individual oscillator.

In such a structure of the image receiving apparatus 400 according to an exemplary embodiment, noise may be added to a broadcast signal as follows: noise may be transmitted from the transmitter to the antenna 410, or noise may be added while the broadcast signal is processed in the image receiving apparatus 400 after being received in the antenna 410. Between the two cases, the latter more significantly causes the noise. Referring to the processes according to this exemplary embodiment, the noise is significantly added to the signal during the frequency shift process of the RFIC 420, and this noise is caused by the oscillating operation of the oscillator provided in the RFIC 420.

According to this exemplary embodiment, since the plurality of antennas 410 are densely arranged within a narrow area, it is expected that the signals respectively received in the plurality of antennas 410 have high correlations therebetween. If the image receiving apparatus 400 has only one RFIC, the signals have low independency with respect to noise even though the signals respectively received in the antennas 410 are respectively input to the RFIC 420. This is because the noise is added to the received signals by the same reason. In other words, if there is only one RFIC, it is difficult to determine and remove noise from the respective received signals since the respective received signals have high noise correlation with each other.

On the other hand, according to this exemplary embodiment, the plurality of RFICs 420 are respectively provided in the plurality of antennas 410 and thus individually processes the signals respectively received in the antenna 410. The respective RFICs 420 process the received signals through their own oscillators, and there are different reasons of causing noise according to the respectively received signals.

The respective input signals input to the adaptive filter 440 originally include broadcast signal components and noise components. Here, the broadcast signal components involved in the respective input signals have high correlation and low independency as described above, while noise involved in the respective input signals have low correlation and high independency due to difference between the reasons of causing the noise.

The adaptive filter 440 gives a weight to each input signal in order to maximize the broadcast signal component and make the noise component negligible as compared with the broadcast signal component. Therefore, the signal output from the adaptive filter 440 becomes a broadcast signal with excellent reception, and the quality of a broadcast image is guaranteed when the output signal is processed.

Below, the process of synthesizing the input signals in the adaptive filter 440 will be described.

Suppose that there are a total of M antennas 410, and let the signals respectively received in the antennas 410 be $r_{i,j}$, where i is an integer from 1 to M and j is an integer from 1 to N. Here, j refers to a time index, i.e. a certain point of time. Further, let data of the signals respectively received in the antennas 410 be $d_{i,j}$, a center frequency of each received signal be fc, and a phase difference of each antenna 410 be $\theta_{i,j}$. With these definitions of variables, the signals respectively received in the antennas 410 at a certain point of time j are represented by the following expressions.

$$r_{1,j} = d_{1,j}e^{j(2\pi f_c t+\theta_{1,j})} + n_{1,j} \quad \text{[Expression 1]}$$
$$r_{2,j} = d_{2,j}e^{j(2\pi f_c t+\theta_{2,j})} + n_{2,j}, \ldots ,$$

-continued
$$r_{M,j} = d_{M,j}e^{j(2\pi f_c t+\theta_{M,j})} + n_{M,j}$$

If the signals respectively received in the antennas 410 have high correlation, it satisfies the following expression.

$$d_j = d_{1,j} = d_{2,j} = \ldots = d_{M,j} \quad \text{[Expression 2]}$$

If the expression 2 is substituted into the expression 1, the expression 1 can be rewritten as follows.

$$r_{1,j} = d_j e^{j(2\pi f_c t+\theta_{1,j})} + n_{1,j} \quad \text{[Expression 3]}$$
$$r_{2,j} = d_j e^{j(2\pi f_c t+\theta_{2,j})} + n_{2,j} \ldots ,$$
$$r_{M,j} = d_j e^{j(2\pi f_c t+\theta_{M,j})} + n_{M,j}$$

In the right side of the expression 3, the first term is the broadcast signal component, and the second term is the noise component. It is notable that the first term of the right side has high correlation but the second term of the right side has low correlation. Therefore, if the adaptive filter 440 gives a weight to each expression to maximize the first term of the right side and minimize the second term of the right side, it is possible to improve a signal-to-noise ratio (SNR) of an output signal from the adaptive filter 440.

Let such a weight, i.e. a complex coefficient of the adaptive filter 440 be $\alpha_{i,j}$. Then, the adaptive filter 440 synthesizes the signals respectively received in the antennas 410 and outputs a signal Rj as follows.

$$R_j = \sum_{i,j} \alpha_{i,j} r_{i,j} \quad \text{[Expression 4]}$$

There are many methods of adjusting $\alpha_{i,j}$ to improve the SNR. For example, there are a non-data aided method and a data aided method.

The non-data aided method improves the SNR of the output from the adaptive filter 440 without using a training sequence. The training sequence is a kind of reference signal embedded in a transmission signal at the transmitter for the determination of the receiver. As an example of the non-data aided method, the adaptive filter 440 limits $\alpha_{i,j}$ as follows.

$$\|\alpha_{i,j}\|^2 = C \quad \text{[Expression 5]}$$

where, C is greater than 0. In this state, the adaptive filter adjusts $\alpha_{i,j}$ to satisfy the following expression, thereby maximizing power of Rj.

$$\underset{(i,j)}{\text{Max}} \|R_j\|^2 \quad \text{[Expression 6]}$$

In the Expression 5 and the Expression 6, a norm function is used. The norm function is to assign a length or size to vectors in a vector space in linear algebra and functional analysis. A zero vector has a norm of 0, and all the other vectors have positive norms. For example, a 2-norm and an infinity-norm of vectors x=[x1, x2, . . . , xn] in an n-dimensional Euclidean space Rn are respectively given satisfying the following expressions.

$$\|x\| = \sqrt{\sum_{i=1}^{n} |x_i|^2} \quad \text{[Expression 7]}$$

-continued $$\|x\|_\infty = \max(|x_1|, |x_2|, \ldots, |x_n|)$$

The data aided method improves the SNR of the output from the adaptive filter 440 with a training sequence Sj embedded in the received signal. For example, the adaptive filter 440 adjusts a complex coefficient αi,j so as to minimize a mean squared error (MSE) between Rj and sj as follows.

$$\min_{(i,j)} \|R_j - s_j\|^2 \qquad \text{[Expression 8]}$$

With these operations, the output SNR of the adaptive filter 440 is greater than the input SNR. Ideally, it is possible to obtain an SNR gain as much as $[3*\text{Log}_2(M)]$ dB with regard to M antennas 410. For instance, if there are eight antennas 410, it is possible to improve the receiving sensitivity as much as 9 dB, and the effect of the reception is proportionally expected.

According to the exemplary embodiment, the plurality of antennas 410 are densely arranged, and the received signals are processed by the RFICs 420 respectively corresponding to the antennas 410 and then synthesized by the adaptive filter 440. Thus, the image receiving apparatus 400 can improve the receiving sensitivity of the broadcast signal and guarantees the quality of a broadcast image.

This exemplary embodiment may be implemented in a front end part of the signal processor 350 (see FIG. 5) that performs the whole processes in the image receiving apparatus 400. This is possible because of high correlation between the signals respectively received in the antenna 410. If the correlation is low, this exemplary embodiment has to be implemented in a rear end part of the whole processes. In this case, it is not easy to remove the noise. Accordingly, the structure according to this exemplary embodiment raises the correlation between the signals respectively received in the antennas 410 so that the noise of the broadcast signal can be more easily removed.

Below, a signal process according to an exemplary embodiment will be described with reference to FIG. 8.

Figure 8:
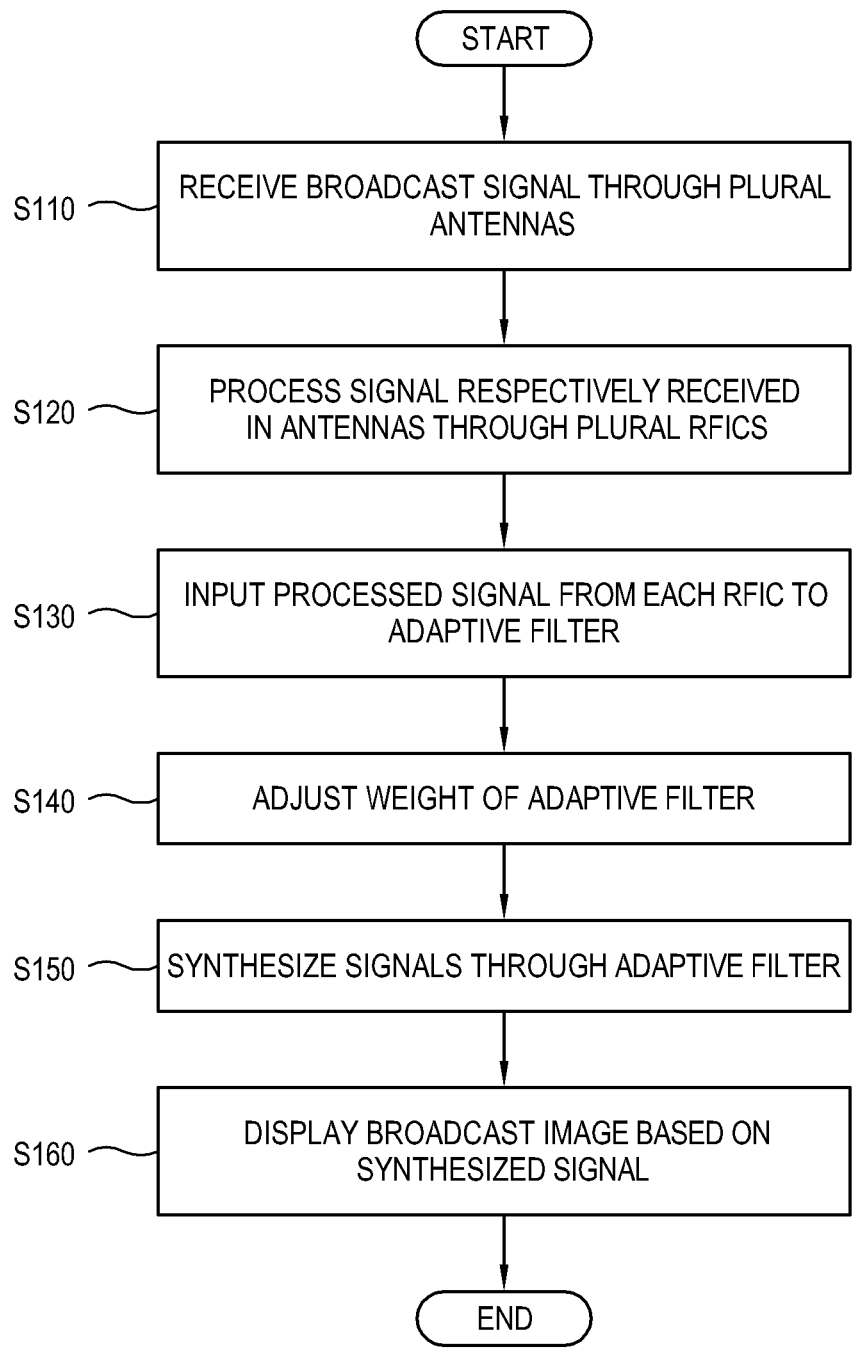
FIG. 8 is a flowchart of a signal process in the image receiving apparatus of FIG. 4.

FIG. 8 is a flowchart of a signal process in the image receiving apparatus 400

As shown in FIG. 8, at operation S110 the image receiving apparatus 400 receives a broadcast signal through the plurality of antennas 410.

At operation S120 the image receiving apparatus 400 processes the signals respectively received in the antennas 410 through the plurality of RFICs 420. The process performed in the RFIC 420 includes receiving a broadcast signal through the antenna 410, and shifting the received broadcast signal from a high frequency band to an intermediate frequency band.

At operation S130 the image receiving apparatus 400 inputs the signal processed by each RFIC 420 to the adaptive filter 440.

At operation S140 the image receiving apparatus 400 adjusts a weight of the adaptive filter 440 in order to improve the SNR. To adjust the weight, the non-data aided method and the data aided method may be used as described above.

At operation S150 the image receiving apparatus 400 synthesizes the received signals in the adaptive filter 440. The synthesizing operation includes an operation of assigning the adjusted weight.

At operation S160 the image receiving apparatus 400 performs an image processing process with regard to the synthesized signal to thereby display a broadcast image.

Below, alternative exemplary embodiments reflecting the present inventive concept will be described.

Figure 9:
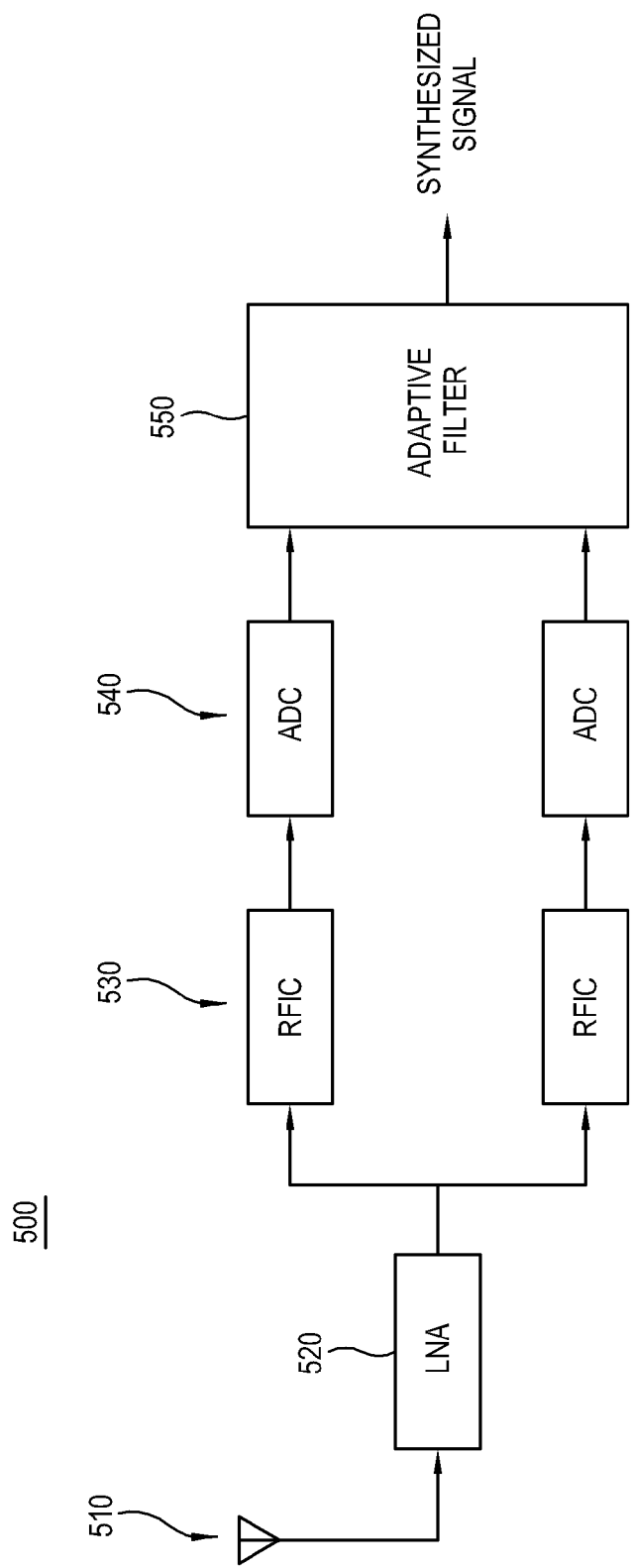
FIG. 9 is a block diagram of an image receiving apparatus according to a fifth exemplary embodiment.

FIG. 9 is a block diagram of an image receiving apparatus 500 according to a fifth exemplary embodiment.

As shown in FIG. 9, the image receiving apparatus 500 according to a fifth exemplary embodiment includes an antenna 510, a low noise amplifier (LNA) 520 for amplifying a broadcast signal received in the antenna 510, a plurality of RFICs 530, a plurality of ADCs 540, and an adaptive filter 550. The RFIC 530, the ADC 540 and the adaptive filter 550 have the same basic functions as those described above, and thus repetitive descriptions thereof will be omitted.

In this exemplary embodiment, a single antenna 510 is provided. According to this exemplary embodiment, a structure for improving signal reception will be described in the case of using the single antenna 510 on the contrary to those of the foregoing exemplary embodiments.

The LNA 520 is designed to minimize noise in order to amplify an RF signal having low intensity. The LNA 520 is positioned near the antenna 520 in order to reduce attenuation in a transmission wire. The broadcast signal received in the antenna 510 is too weak to be processed in the image receiving apparatus 500, and therefore has to have intensity of a proper level. Thus, the LNA 520 is used to amplify the broadcast signal up to proper intensity. In particular, according to this exemplary embodiment, the signal received in the single antenna 510 has to be branched, and therefore the LNA 520 is installed at a front end before a corresponding branch point to thereby amplify the signal received in the antenna 510 and transmit the amplified signal to each of the branched RFICs 530.

The RFICs 530 are provided corresponding to branches of the signals amplified by the LNA 520. According to this exemplary embodiment, two RFICs 530 are provided corresponding to two branches.

The operations of the RFIC 530, the ADC 540 and the adaptive filter 550 are the same as those of the foregoing exemplary embodiments, and thus repetitive descriptions thereof will be avoided. In this embodiment, the LNA 520 is to compensate for signal attenuation due to the branch of the signals. If the noise figure of the LNA 520 is sufficiently low, it is possible to guarantee the gain according to this exemplary embodiment. However, it is practically impossible that the noise figure of the LNA 520 is 0, and therefore the gain is lower than that of the fourth exemplary embodiment.

Below, a signal process according to this exemplary embodiment will be described with reference to FIG. 10.

Figure 10:
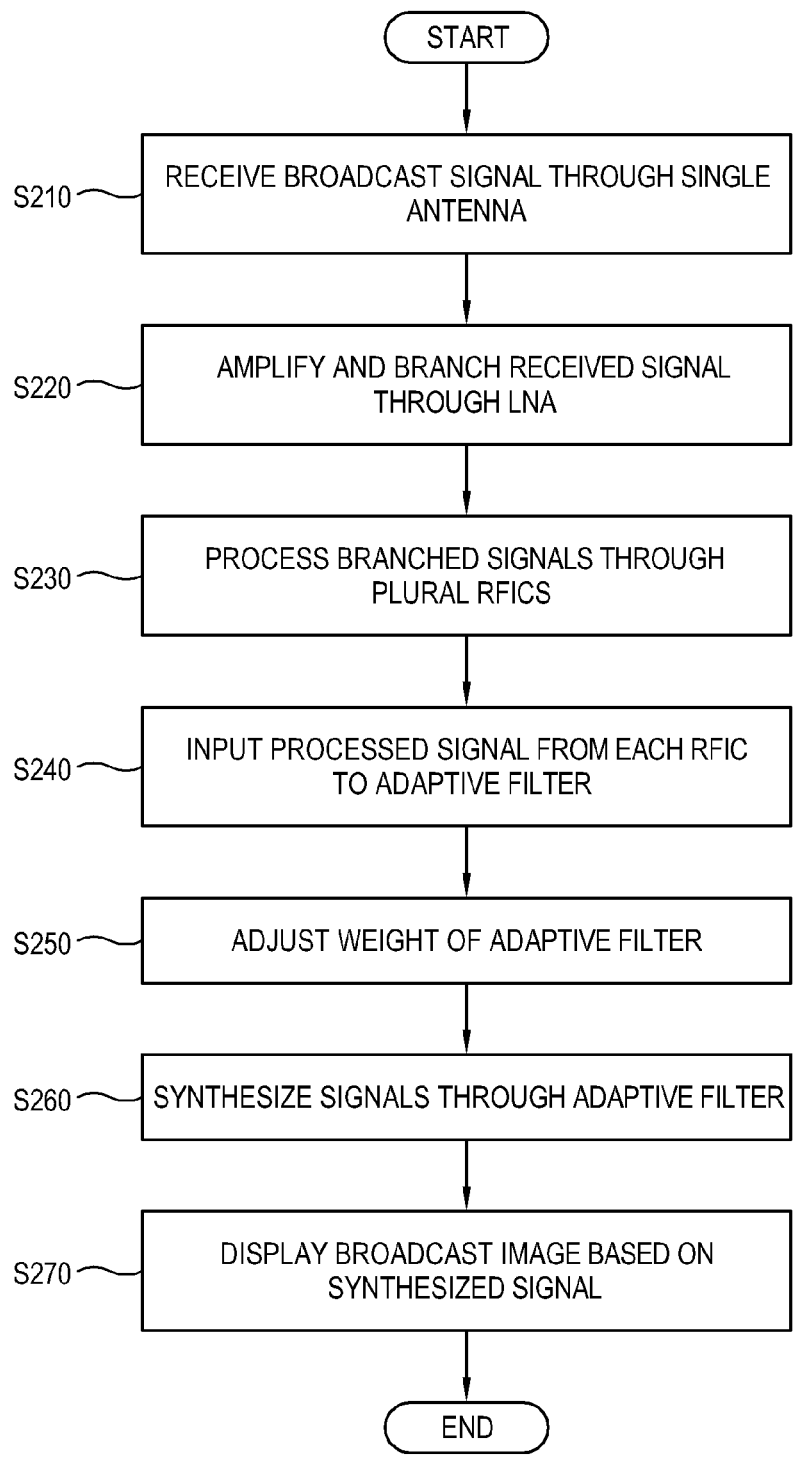
FIG. 10 is a flowchart of a signal process in the image receiving apparatus of FIG. 9.

FIG. 10 is a flowchart of a signal process in the image receiving apparatus 500.

As shown in FIG. 10, at operation S210 the image receiving apparatus 500 receives a broadcast signal through the single antenna 510.

At operation S220 the image receiving apparatus 500 amplifies and branches the received signal through the LNA 520. The number of branches may be varied depending on design methods.

At operation S230 the image receiving apparatus 500 processes the branched signals through the plurality of RFICs 530. The number of RFIC 530 is equal to the number of branched signals from the LNA 520, and each RFIC 530 shifts the received signals from a high frequency band to an intermediate frequency band.

At operation S240 the image receiving apparatus 500 inputs the signal processed by each RFIC 530 to the adaptive filter 550.

At operation S250 the image receiving apparatus 500 adjusts a weight of the adaptive filter 550 in order to improve the SNR. To adjust the weight, the non-data aided method and the data aided method may be used as described above.

At operation S260 the image receiving apparatus 500 synthesizes the received signals through the adaptive filter 550. The synthesizing operation includes an operation of assigning the adjusted weight.

At operation S270 the image receiving apparatus 500 performs an image processing process with regard to the synthesized signal to thereby display a broadcast image.

Figure 11:
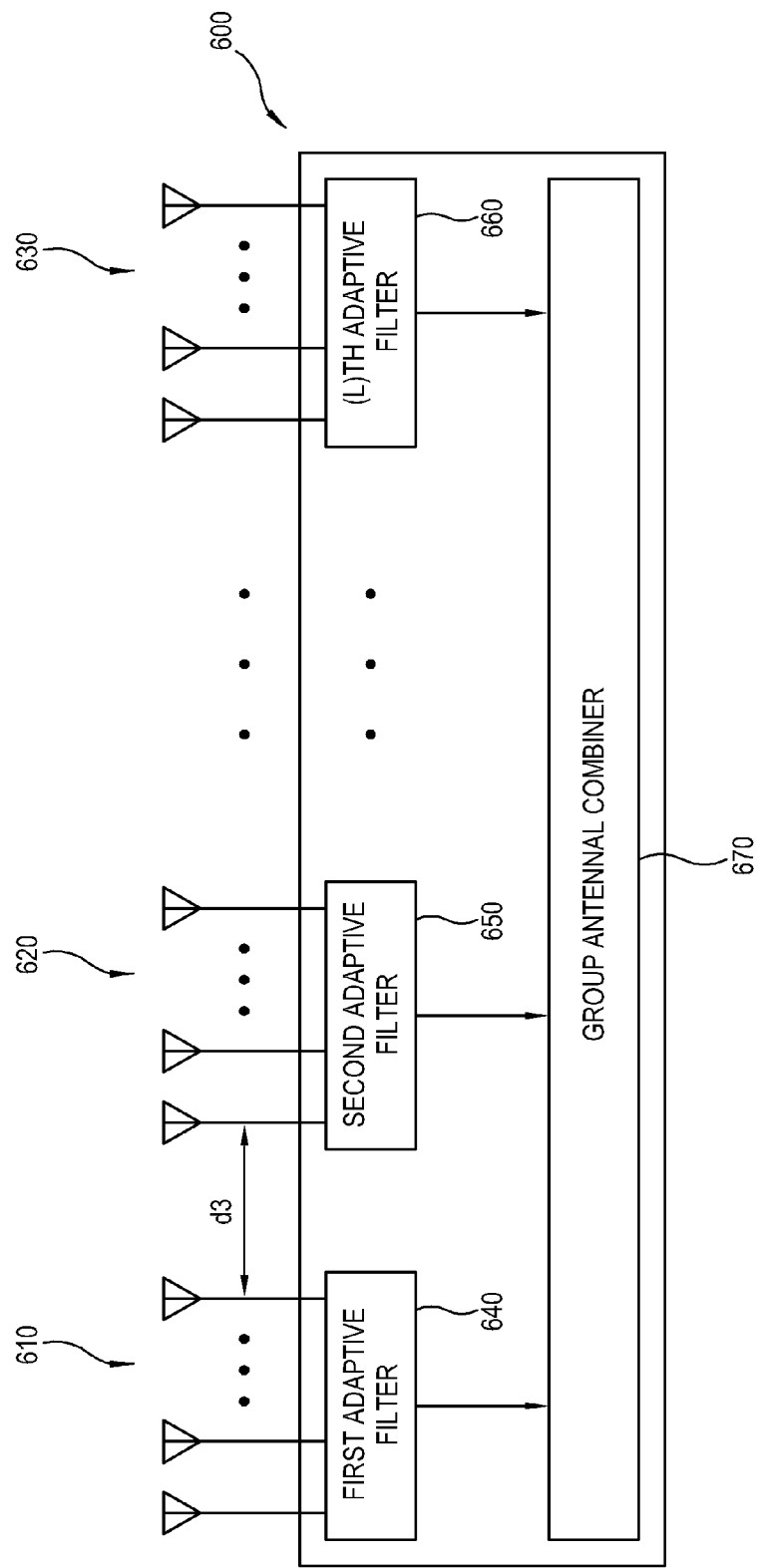
FIG. 11 is a block diagram of an image receiving apparatus according to a sixth exemplary embodiment.

FIG. 11 is a block diagram of an image receiving apparatus 600 according to a sixth exemplary embodiment;

As shown in FIG. 11, the image receiving apparatus 600 includes a plurality of antennas groups 610, 620 and 630; a plurality of adaptive filters 640, 650 and 660 respectively corresponding to the antenna groups 610, 620 and 630; and a group antenna combiner 670 for synthesizing signals respectively output from the adaptive filters 640, 650 and 660. The group antenna combiner may be circuitry, software, or a combination of circuitry and software. The front end structures of the adaptive filters 640, 650 and 660 are the same as those described above, and thus repetitive descriptions thereof will be avoided as necessary.

If there are a total of L antenna groups 610, 620 and 630, each of the antenna groups 610, 620 and 630 includes a plurality of single antennas. The plurality of single antennas included in a certain antenna group 610, 620 or 630 are densely arranged within a circle having a diameter shorter than a half wavelength of the received signal. For example, a distance between two single antennas farthest away from each other among the plurality of single antennas in a first antenna group 610 is shorter than a half wavelength of the received signal.

Additionally, a distance d3 between two adjacent antenna groups 610 and 620 is equal to or longer than a half wavelength of the received signal. For example, if the first antenna group 610 and the second antenna group 620 are closest to each other among the plurality of antennas groups 610, 620 and 630, the distance d3 between the first antenna group 610 and the second antenna group 620 is not shorter than a half wave length of the received signal.

Such a structure has two effects in terms of each of the antenna groups 610, 620 and 630 and the whole plurality of antennas groups 610, 620 and 630. In the former case, each of the antenna groups 610, 620 and 630 includes a plurality of single antennas arranged densely, the receiving sensitivity of the antenna will be improved. In the latter case, the antenna groups 610, 620 and 630 are spaced apart from one another at a predetermined distance, the antenna diversity will be improved. In other words, the gain of the receiving sensitivity is gained within each of the antenna groups 610, 620 and 630, and the antenna diversity is gained from the other separated antenna groups 610, 620 and 630.

Accordingly, the broadcast signal finally synthesized and output by the group antenna combiner 670 is improved in the antenna receiving sensitivity and the antenna diversity.

Below, a signal process according to this exemplary embodiment will be described with reference to FIG. 12.

Figure 12:
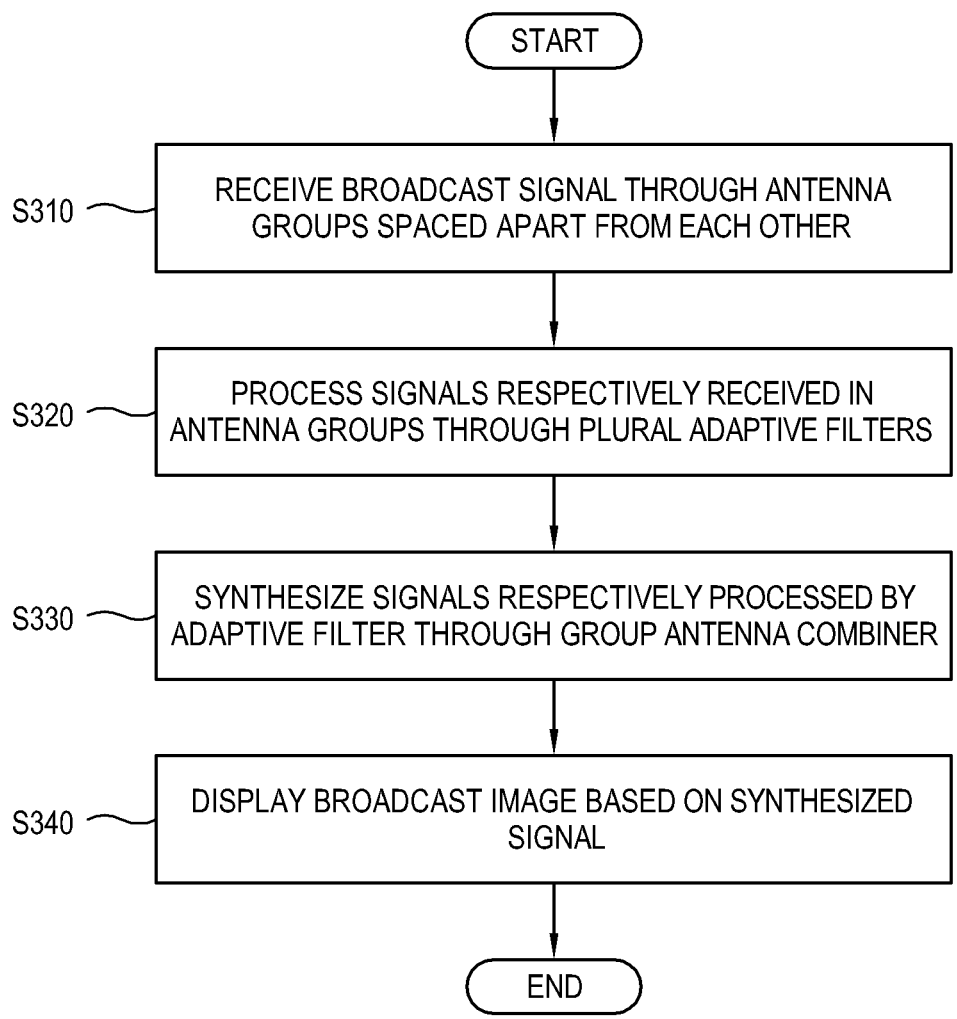
FIG. 12 is a flowchart of a signal process in the image receiving apparatus of FIG. 11.

FIG. 12 is a flowchart of a signal process in the image receiving apparatus 600.

As shown in FIG. 12, at operation S310 the image receiving apparatus 600 receives a broadcast signal through the antenna groups 610, 620 and 630 spaced apart from one another. Each of the antenna groups 610, 620 and 630 includes a plurality of single antennas arranged densely, and two adjacent antenna groups 610 and 620 are spaced apart from each other at a distance equal to or longer than a half wavelength of the broadcast signal.

At operation S320 the image receiving apparatus 600 individually synthesizes signals respectively received in the antenna groups 610, 620 and 630 through the plurality of adaptive filters 640, 650 and 660. That is, each single antenna within a certain antenna group 610, 620 or 630 receives a broadcast signal, and the adaptive filters 640, 650 and 660 synthesize the signals received in the single antennas, respectively. According to this exemplary embodiment, there are a total of L antenna groups 610, 620 and 630 and L adaptive filters 640, 650 and 660, and thus a total of L signals are input to the group antenna combiner 670.

At operation S330 the image receiving apparatus 600 synthesizes the signals respectively processed by the adaptive filters 640, 650 and 660 through the group antenna combiner 670.

At operation S340 the image receiving apparatus 600 processes the synthesized signals to be displayed as a broadcast image.

By expanding the principle of the foregoing sixth exemplary embodiment, both the indoor antenna group and the outdoor antenna may be used, and this embodiment will be described below.

Figure 13:
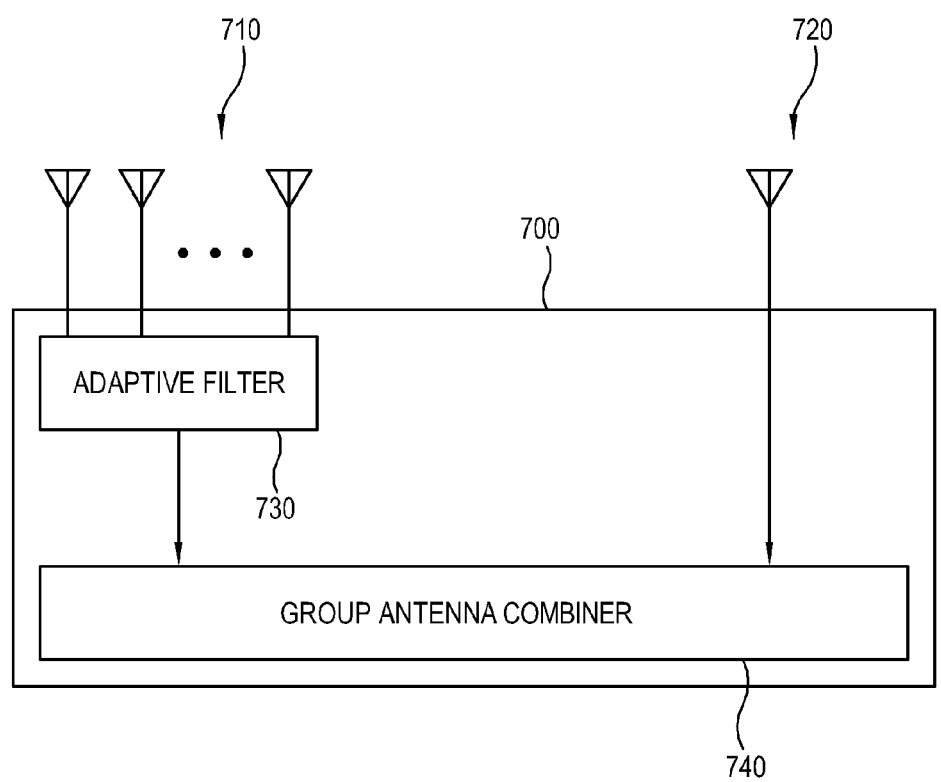
FIG. 13 is a block diagram of an image receiving apparatus according to a seventh exemplary embodiment.

FIG. 13 is a block diagram of an image receiving apparatus 700 according to a seventh exemplary embodiment;

As shown in FIG. 13, the image receiving apparatus 700 according to the seventh exemplary embodiment includes an indoor antenna group 710, an outdoor antenna 720, an adaptive filter 730, and a group antenna combiner 740. The indoor antenna group 710 includes a plurality of single antennas, and the respective single antennas are densely arranged within a circle having a diameter shorter than $\lambda/2$. The indoor antenna group 710 is installed indoors or the like circumstances where the receiving electric field is relatively low, and the outdoor antenna 720 is installed outdoors such as on the rooftop or the like circumstances where the receiving electric field is relatively high. Of course, the distance between the indoor antenna group 710 and the outdoor antenna 720 is longer than $\lambda/2$.

The operations of the adaptive filter 730 and the group antenna combiner 740 are the same as those described above, and thus repetitive descriptions thereof will be avoided as necessary.

With development of technology, 8 K ultra high definition (UHD) terrestrial broadcasting will be realized in the future. The UHD is also called ultra-high definition video (UHDV) or super hi-vision (SHV). In terms of color representation, while the current digital television (DTV) generally uses 8 bits, the UHD assigns 10 bits or 12 bits per channel.

In terms of resolution, high definition (HD) supports a resolution of 1360×768, full high definition (FHD) supports a resolution of 1920×1080, quad high definition (QHD) supports a resolution of 2560×1440, and UHD supports a resolution higher than that of QHD. 4 K UHD supports a resolution of 3840×2160, and 8 K UHD supports a resolution of 7680×4320. Further, 8 K UHD includes about 33 million pixels.

To display a broadcast image by receiving a UHD broadcast signal, it is important to improve the reception of the broadcast signal transmitted from the transmitter (not shown) of the broadcasting station. To this end, the broadcast signal is received through many antennas, and the broadcast signals respectively received in the antennas are synthesized, thereby finally obtaining a signal with excellent quality. Taking these circumstances into account, the indoor antenna group 710 is added to the circumstances where the outdoor antenna 720 is installed, so that 8 K UHD terrestrial broadcasting or the like broadcast image having a very high resolution can be provided.

Additionally, when two or more signals are synthesized to finally obtain a signal with high quality and low noise, difference in quality between the signals to be synthesized has to be within an allowable range.

If a single indoor antenna is installed in the state that the outdoor antenna has been installed, the broadcast signal received in the outdoor antenna and the broadcast signal received in the single indoor antenna are very different in quality from each other. Specifically, the quality of the broadcast signal received in the single indoor antenna is significantly lower than that of the broadcast signal received in the outdoor antenna, and therefore it is therefore difficult to get a sufficient gain even though two signals are synthesized.

On the other hand, according to this exemplary embodiment, the adaptive filter 730 synthesizes the broadcast signals respectively received in the single antennas included in the indoor antenna group 710 and outputs it to the group antenna combiner 740. Further, the broadcast signal received in the outdoor antenna 720 is input to the group antenna combiner 740. According to the operations of the foregoing exemplary embodiments, the broadcast signal output from the adaptive filter 730 is improved in quality up to a level approximate to that of the outdoor antenna 720.

The group antenna combiner 740 synthesizes the signal from the adaptive filter 730 and the signal from the outdoor antenna 720, and thus finally gets a broadcast signal with high quality. With this process, the image receiving apparatus 700 receives a broadcast signal of 8 K UHD terrestrial broadcasting or the like UHD broadcast signal and displays a broadcast image with good quality.

Below, a signal process according to an exemplary embodiment will be described with reference to FIG. 14.

Figure 14:
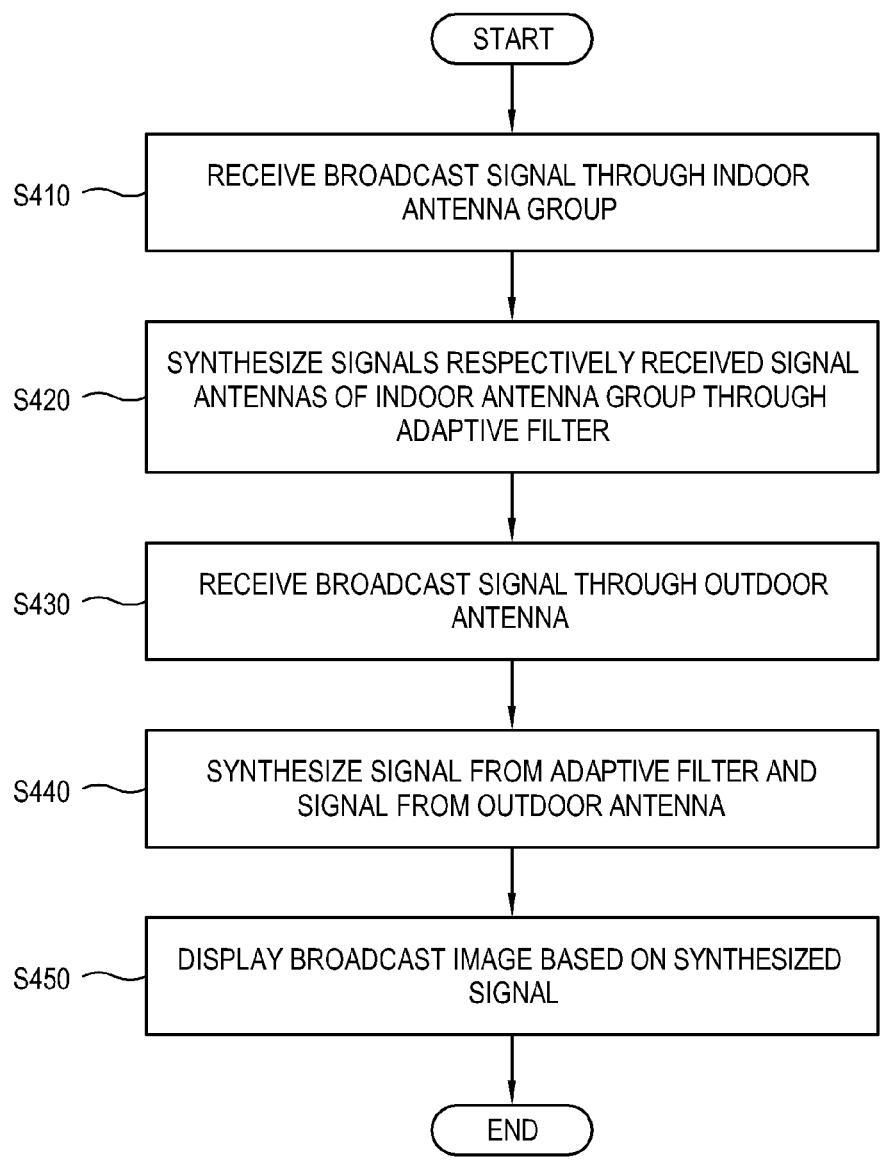
FIG. 14 is a flowchart of a signal process in the image receiving apparatus of FIG. 13.

FIG. 14 is a flowchart of a signal process in the image receiving apparatus 700.

As shown in FIG. 14, at operation S410 the image receiving apparatus 700 receives a broadcast signal through the indoor antenna group 710.

At operation S420 the image receiving apparatus 700 synthesizes the broadcast signals respectively received in the single antennas in the indoor antenna group 710 through the adaptive filter 730.

At operation S430 the image receiving apparatus 700 receives the broadcast signal through the outdoor antenna 720.

At operation S440 the image receiving apparatus 700 synthesizes the signal from the adaptive filter 730 and the signal from the outdoor antenna 720.

At operation S450 the image receiving apparatus 700 processes the synthesized signal and displays a broadcast image.

In the foregoing embodiment, each of the indoor antenna group 710, the adaptive filter 730 and the outdoor antenna 720 is one, but not limited thereto. Alternatively, each of the indoor antenna group 710 and the corresponding adaptive filter 730 may be two or more.

Figure 15:
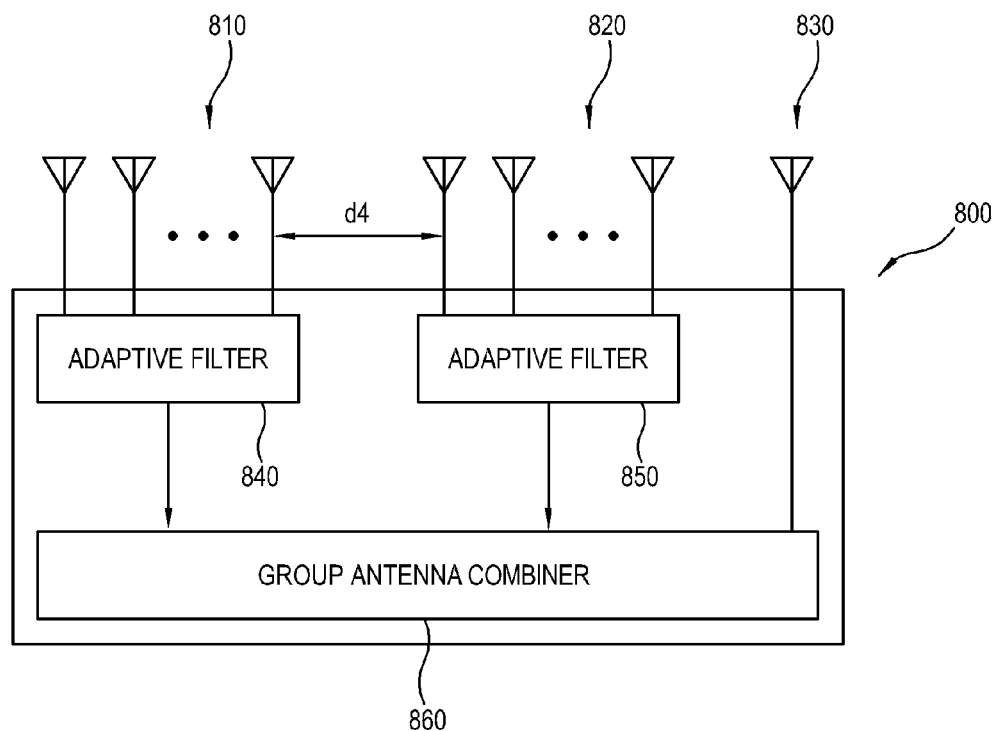
FIG. 15 is a block diagram of an image receiving apparatus according to an eighth exemplary embodiment.

FIG. 15 is a block diagram of an image receiving apparatus 800 according to an eighth exemplary embodiment.

As shown in FIG. 15, the image receiving apparatus 800 according to the eighth exemplary embodiment includes a plurality of indoor antenna groups 810 and 820, and a plurality of adaptive filter 840 and 850 respectively corresponding to the plurality of indoor antenna groups 810 and 820, and a group antenna combiner 860. The operations of the adaptive filters 840 and 850 and the group antenna combiner 860 are the same as those described above, and thus repetitive descriptions thereof will be avoided.

According to this exemplary embodiment, a first indoor antenna group 810 and a second indoor antenna group 820 are installed. Of course, three or more indoor antenna groups 810 and 820 may be installed. Each of the indoor antenna groups 810 and 820 includes a plurality of single antennas, and the single antennas in each of the indoor antenna groups 810 and 820 are densely arranged within a circle having a diameter shorter than $\lambda/2$. Thus, it will be expected that the signal receiving sensitivity is improved by the respective indoor antenna groups 810 and 820.

However, a distance d4 between the first indoor antenna group 810 and the second indoor antenna group 820, adjacent to each other, is equal to or longer than $\lambda/2$. Therefore, it will be expected that the antenna diversity effect is improved in terms of the whole indoor antenna groups 810 and 820.

If the plurality of indoor antenna groups 810 and 820 are provided according to this exemplary embodiment, the antenna diversity is more improved than that of the foregoing seventh exemplary embodiment.

Below, a signal process according to an exemplary embodiment will be described with reference to FIG. 16.

Figure 16:
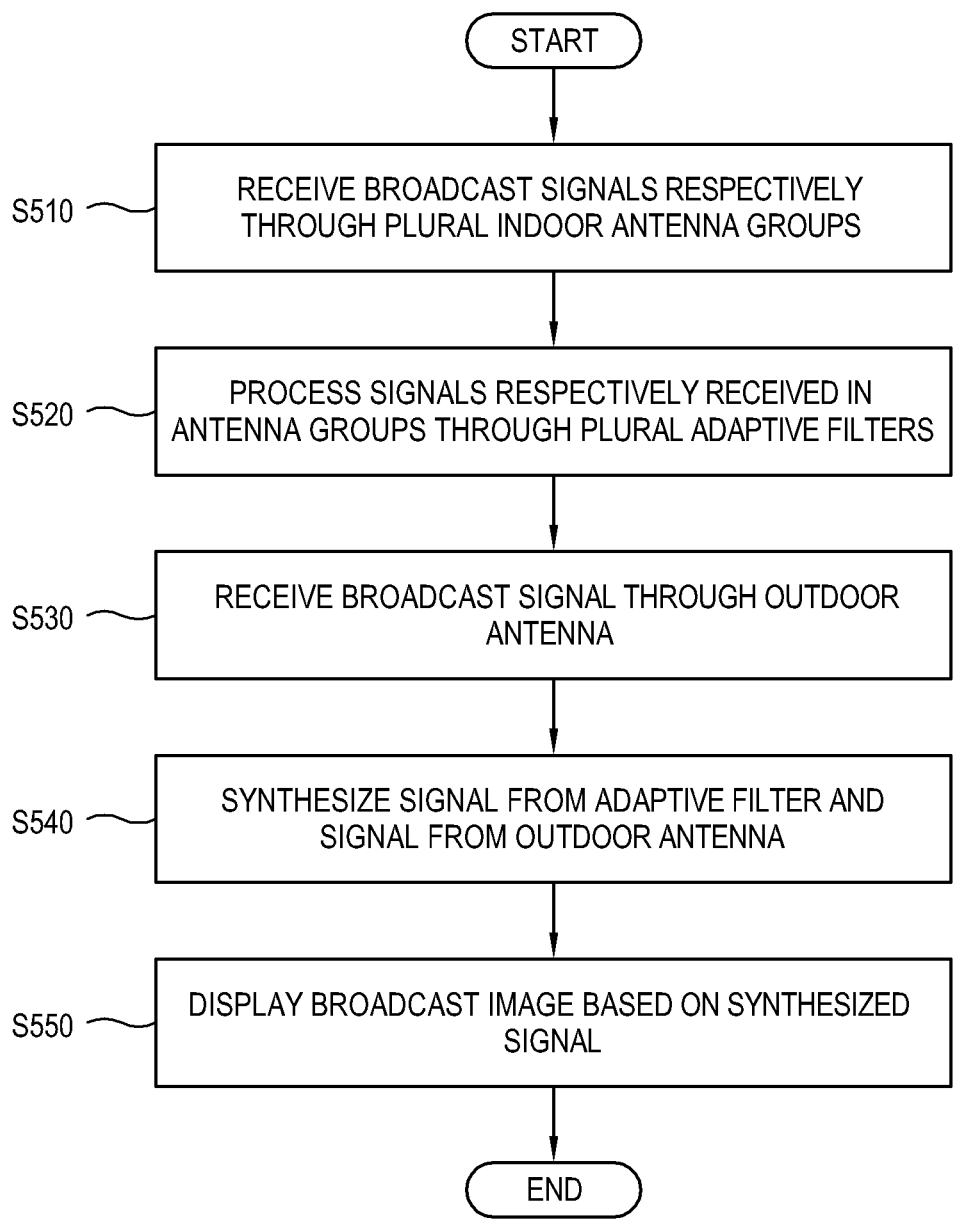
FIG. 16 is a flowchart of a signal process in the image receiving apparatus of FIG. 15.

FIG. 16 is a flowchart of a signal process in the image receiving apparatus 800.

As shown in FIG. 16, at operation S510 the image receiving apparatus 800 receives a broadcast signal through each of the plurality of indoor antenna groups 810 and 820. Each of the indoor antenna groups 810 and 820 includes a plurality of single antennas densely arranged within a circle having a diameter shorter than a half wavelength of the broadcast signal, and a distance between two adjacent antenna groups 810 and 820 is longer than a half wavelength of the broadcast signal.

At operation S520 the image receiving apparatus 800 synthesizes the signals respectively received in the indoor antenna groups 810 and 820 through plurality of adaptive filters 840 and 850, respectively. That is, the single antennas in a certain antenna group 810 or 820 respectively receive the broadcast signals, and the adaptive filters 840 and 850 respectively synthesize the signals respectively received in the single antennas.

At operation S530 the image receiving apparatus 800 receives the broadcast signal through the outdoor antenna 830.

At operation S540 the image receiving apparatus 800 synthesizes the signals from the respective adaptive filters 840 and 850 and the signal from the outdoor antenna 830.

At operation S550 the image receiving apparatus 800 processes the synthesized signal and displays a broadcast image based on the processed signal.

Figure 17:
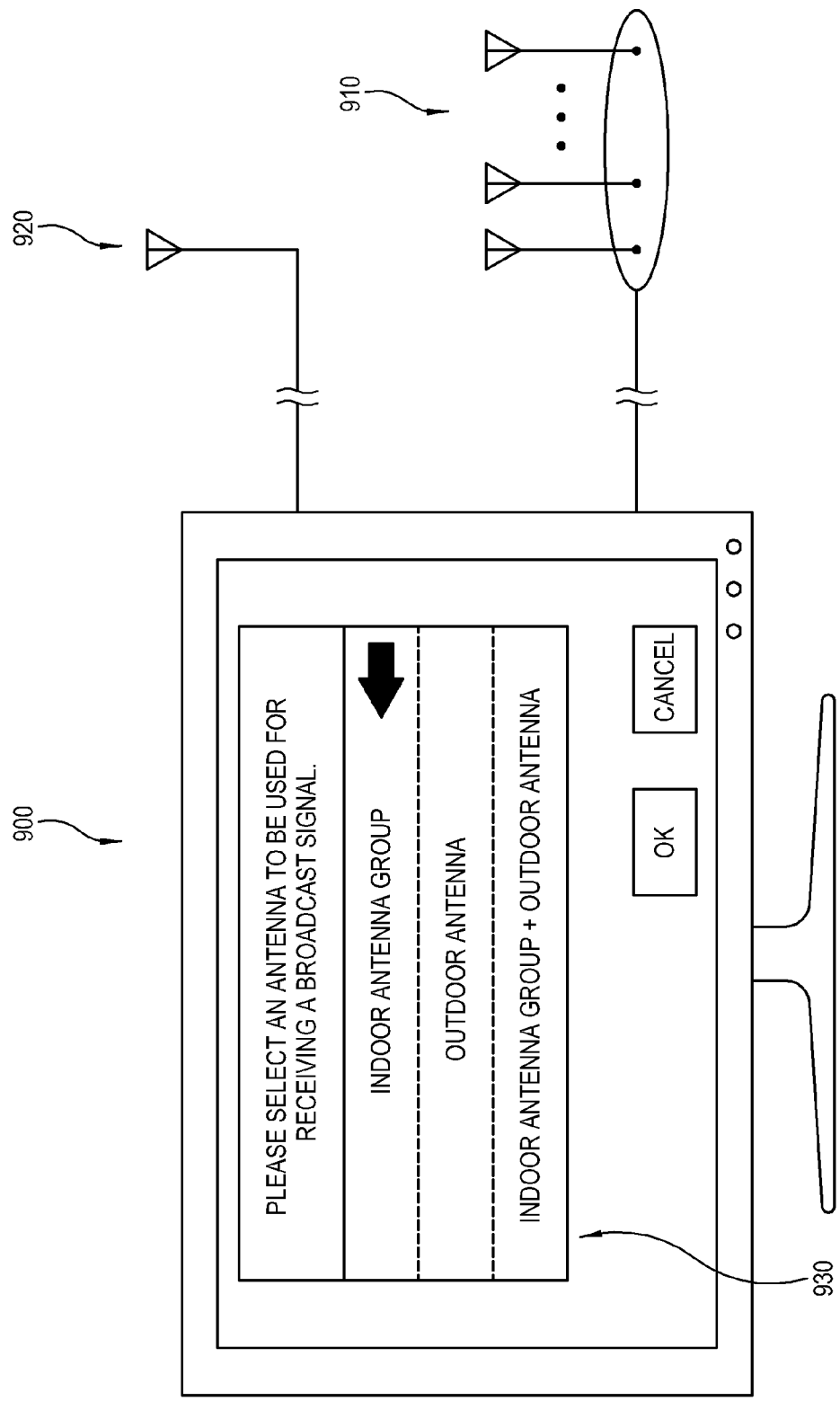
FIG. 17 illustrates a user interface (UI) to be displayed on an image receiving apparatus according to a ninth exemplary embodiment.

FIG. 17 illustrates a user interface (UI) to be displayed on an image receiving apparatus 900 according to a ninth exemplary embodiment.

As shown in FIG. 17, the image receiving apparatus 900 according to the ninth exemplary embodiment is connected to one or more indoor antenna groups 910 and an outdoor antenna 920. In this state, the image receiving apparatus 900 displays a UI 930, through which the antennas 910 and 920 to be used for receiving the broadcast signal is selected by a user, in response to a preset event. The preset event may be generated by a user's preset input, or may be automatically generated when the broadcast signal is first sensed by the antennas 910 and 920.

When the UI 930 is displayed, a user may select one among options displayed on the UI 930. The image receiving apparatus 900 operates based on the options selected by a user. The options displayed on the UI 930 may include a case of using only the indoor antenna group 910 to receive the broadcast signal, a case of using only the outdoor antenna 920 to receive the broadcast signal, and a case of using both the indoor antenna group 910 and the outdoor antenna 920 to receive the broadcast signal.

A user may properly select the option in consideration of the characteristics of the broadcast signal to be received and the receiving circumstances of the image receiving apparatus 900. For example, if the broadcast signal corresponds to a relatively low image quality, a user may use only one of the indoor antenna group 910 and the outdoor antenna 920 to receive the broadcast signal. On the other hand, if the broadcast signal corresponds to a relatively high image quality, a user may select the option of using both the indoor antenna group 910 and the outdoor antenna 920 to receive the broadcast signal since the reception quality of the broadcast signal is very important.

Figure 18:
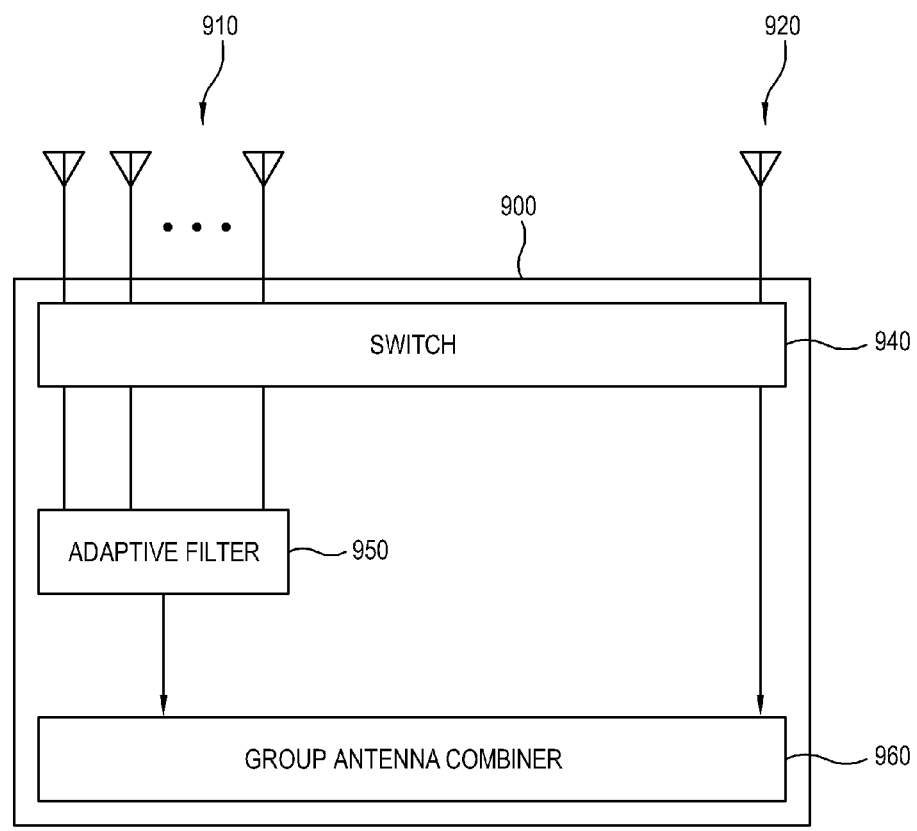
FIG. 18 is a block diagram of the image receiving apparatus of FIG. 17.

FIG. 18 is a block diagram of the image receiving apparatus 900.

As shown in FIG. 18, the image receiving apparatus 900 includes a switch 940, an adaptive filter 950, and a group antenna combiner 960. The operations of the adaptive filter 950 and the group antenna combiner 960 are substantially the same as those described as above.

The switch 940 is installed on a path of transferring the broadcast signal received in each of the indoor antenna group 910 and the outdoor antenna 920. The switch 940 selectively prevents the broadcast signal received in the indoor antenna group 910 from being transmitted to the adaptive filter 950, or selectively prevents the broadcast signal received in the outdoor antenna 920 from being transmitted to the group antenna combiner 960. The operation of the switch 940 may be controlled by a microcontroller, a CPU or the like separate element provided in the image receiving apparatus 900.

The switch 940 may be arranged in a front end of the adaptive filter 950 rather than a rear end in order to prevent the adaptive filter 950 from processing the broadcast signal in the case that the indoor antenna group 910 is not used. However, alternatively, the switch 940 may be arranged on the path of signal transmission between the adaptive filter 950 and the group antenna combiner 960.

If a user selects the option of using only the indoor antenna group 910 through the UI 930 (see FIG. 17), the switch 940 allows the broadcast signal received in the indoor antenna group 910 to be transmitted to the adaptive filter 950 but prevents the broadcast signal received in the outdoor antenna 920 from being transmitted to the group antenna combiner 960.

If a user selects the option of using only the outdoor antenna 920, the switch 940 prevents the broadcast signal received in the indoor antenna group 910 from being transmitted to the adaptive filter 950 but allows the broadcast signal received in the outdoor antenna 920 to be transmitted to the group antenna combiner 960.

If a user selects the option of using both the indoor antenna group 910 and the outdoor antenna 920, the switch 940 allows the broadcast signal received in the indoor antenna group 910 to be transmitted to the adaptive filter 950 and allows the broadcast signal received in the outdoor antenna 920 to be transmitted to the group antenna combiner 960.

The group antenna combiner 960 processes the signal in accordance with the options. For example, if the signals are received from both the adaptive filter 950 and the outdoor antenna 920, the group antenna combiner 960 synthesizes the received signals. On the other hand, if the signal is received from only one of the adaptive filter 950 and the outdoor antenna 920, the group antenna combiner 960 outputs the signals to be processed by the next process since there is no need of a signal synthesizing process.

In the foregoing exemplary embodiments, the terrestrial broadcasting was described. However, the exemplary embodiments may be applicable to cable broadcasting, satellite broadcasting, etc. In the case of the cable broadcasting, the antennas of the foregoing exemplary embodiments may be replaced by cables. Further, in the case of the satellite broadcasting, the antennas of the foregoing exemplary embodiments may be replaced by satellite antennas.

Further, the foregoing exemplary embodiments described the image receiving apparatus. However, the exemplary embodiments may also be applied to a wireless communication solution such as Wi-Fi, Bluetooth, etc. as well as the image receiving apparatus such as an image processing apparatus, a display apparatus, etc.

Figure 19:
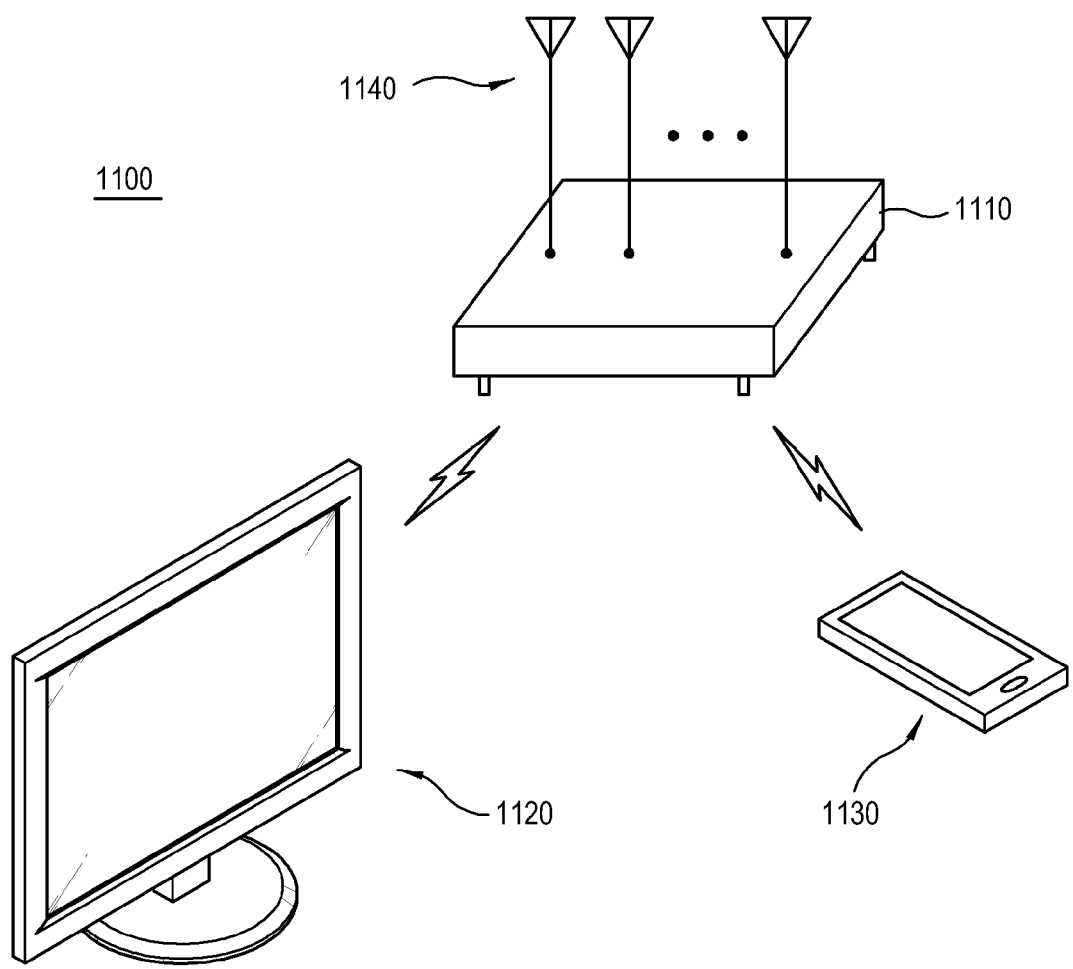
FIG. 19 illustrates a system according to a tenth exemplary embodiment.

FIG. 19 illustrates a system 1100 according to a tenth exemplary embodiment.

As shown in FIG. 19, the system 1100 according to the tenth exemplary embodiment includes an access point (AP) 1110, and at least one external apparatuses 1120 and 1130 wirelessly connected to the AP 1110. According to this exemplary embodiment, the AP 1110 for relaying interactive wireless communication is provided as an example of the relay, but not limited thereto. The AP 1110 may be replaced by a device for wirelessly transmitting signals received in the plurality of antennas 1140 to the external apparatuses 1120 and 1130 without the interactive wireless communication.

The AP 1110 is a device that relays communication so that the external apparatuses 1120 and 1130 can wirelessly connect with a computer network through Wi-Fi or the like wireless communication standards. The AP 1110 is connected to a router generally using a wired network, so that the external apparatuses 1120 and 1130 can do wireless interactive communication with the wired network.

The external apparatuses 1120 and 1130 may wirelessly connect with the AP 1110 and perform communication via the AP 1110. To this end, each of the external apparatuses 1120 and 1130 includes a wireless communication module for communication with the AP 1110.

The AP 1110 is provided with a plurality of single antennas 1140. The single antennas 1140 are densely arranged within a circle having a diameter shorter than $\lambda/2$. The AP 1110 processes a signal received through the plurality of antennas 1140 and wirelessly transmits it to the external apparatuses 1120 and 1130 while connecting with the wired network.

Figure 20:
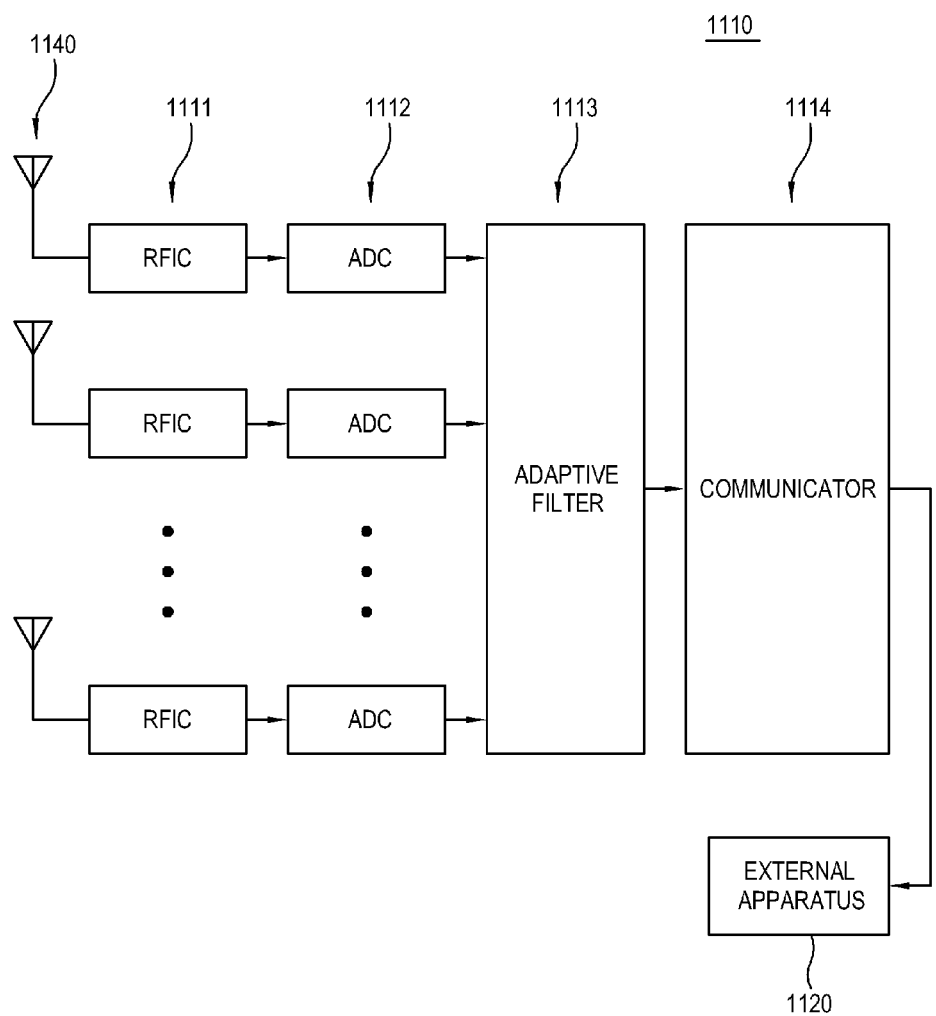
FIG. 20 is a block diagram of an access point (AP) in the System of FIG. 19.

FIG. 20 is a block diagram of the AP 1110.

As shown in FIG. 20, the AP 1110 is individually provided corresponding to the plurality of antennas 1140 and thus includes a plurality of RFICs 1111 for receiving RF signals respectively received in the antennas 1140, a plurality of ADCs 1112 for converting analog signals respectively output from the RFICs 1111 into digital signals, an adaptive filter 1113 for synthesizing the digital signals respectively output from the ADC 1112, and a communicator 1114 for wirelessly transmitting the synthesized signal from the adaptive filter 1113 to the external apparatus 1120 or 1130.

The process of synthesizing the RF signals respectively received in the plurality of antennas 1140 through the adaptive filter 1113 is substantially the same as that described above, and thus repetitive descriptions thereof will be avoided. The communicator 1114 may change the synthesized signal output from the adaptive filter 1113 in accordance with preset communication standards so that the synthesized signal can be wirelessly transmitted to the external apparatus 1120. Alternatively, the communicator 1114 may transmit the synthesized signal to the external apparatus 1120 not wirelessly but using a wire.

Thus, the foregoing structure of transmitting the synthesized signal to the external apparatuses 1120 and 1130 through the relay 1110 having the plurality of antennas 1140 has advantages as follows. As described in the foregoing exemplary embodiments, the plurality of antennas 1140 have to be densely arranged within a circle having a diameter shorter than λ/2 and the RFICs 1111 have to be provided corresponding to the respective antennas 1140 in order to raise the sensitivity of receiving the RF signal.

However, the TV or the like external apparatuses 1120 and 1130 may have only one RFIC 1111 or have the RFICs 111 that do not correspond to the number of antennas 1140. This situation may occur if the external apparatus 1120 or 1130 is first purchased without considering the antennas 1140 to be installed at the indoor circumstances, and then the antennas 1140 are additionally installed indoors in order to improve the reception of the broadcast signal.

Thus, a user can obtain the foregoing effects by installing the relay 1110 having the plurality of antennas 1140 without changing the existing external apparatuses 1120 and 1130.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for materializing the exemplary embodiments. The program command recorded in this storage medium may be specially designed and configured according to the exemplary embodiments.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcast receiving apparatus comprising:
   a plurality of antennas comprising at least three antennas arranged at preset intervals, each antenna of the plurality of antennas being configured to receive a broadcast signal;
   a plurality of receiving modules, each receiving module of the plurality of receiving modules being configured to convert the broadcast signal received by a corresponding antenna of the plurality of antennas into a first signal and output the first signal;
   a filter configured to filter a noise component out of the first signals output by the plurality of receiving modules, synthesize the first signals into a second signal and output the second signal; and
   a signal processor configured to perform a signal process for displaying an image based on the second signal output from the filter,
   wherein a distance between two outermost antennas selected from among the plurality of antennas is less than a half of a wavelength of the broadcast signal.

2. The broadcast receiving apparatus according to claim 1, wherein each receiving module of the plurality of receiving modules is configured to convert the broadcast signal into the first signal by shifting the broadcast signal received in the corresponding unit antenna from a high frequency band into an intermediate frequency band.

3. The broadcast receiving apparatus according to claim 2, wherein each receiving module of the plurality of the receiving module comprises a radio frequency integrated circuit (RFIC).

4. The broadcast receiving apparatus according to claim 1, wherein each of the first signals comprises a broadcast signal component and the noise component, and the filter is configured to acquire the broadcast signal components having relatively high correlation and remove the noise component having relatively low correlation by comparison between the first signals.

5. The broadcast receiving apparatus according to claim 1, wherein the filter comprises an adaptive filter.

6. The broadcast receiving apparatus according to claim 1, further comprising:
   a second antenna group comprising at least one antenna and spaced apart from a first antenna group comprising the plurality of antennas; and
   a signal synthesizer configured to synthesize second signals corresponding to the first antenna group and the second antenna group into a third signal and output the third signal to the signal processor.

7. The broadcast receiving apparatus according to claim 6, wherein a minimum distance between the first antenna group and the second antenna group is longer than a half wavelength of the broadcast signal.

8. The broadcast receiving apparatus according to claim 6, wherein the first antenna group is located at a place where a receiving electric field is weaker than a receiving electric field of a place for the second antenna group.

9. A method of controlling a broadcast receiving apparatus, the method comprising:
   receiving a broadcast signal through a plurality of antennas including at least three antennas arranged at preset intervals;
   converting, by a plurality of receiving modules respectively corresponding to the plurality of antennas, the broadcast signal received in the plurality of antennas into first signals;
   filtering, by a filter, a noise component out of the first signals and synthesizing the first signals into a second signal; and
   displaying an image by processing the second signal output, wherein, a distance between two outermost antennas selected from among the plurality of antennas is less than a half of a wavelength of the broadcast signal.

10. The method according to claim 9, wherein the converting the broadcast signal into the first signals comprises converting the broadcast signal into the first signals by shifting the broadcast signal received in each of the plurality of antennas from a high frequency band into an intermediate frequency band.

11. The method according to claim 10, wherein each of the plurality of receiving modules comprises a radio frequency integrated circuit (RFIC).

12. The method according to claim 9, wherein each of the first signals comprises a broadcast signal component and the noise component, and
the synthesizing the first signals into the second signal comprises acquiring the broadcast signal components having relatively high correlation and removing the noise component having relatively low correlation by comparison between the first signals.

13. The method according to claim 9, wherein the filter comprises an adaptive filter.

14. The method according to claim 9, further comprising a second antenna group comprising at least one antenna and spaced apart from a first antenna group comprising the plurality of antennas,
wherein displaying the image comprises displaying an image based on a third signal obtained by synthesizing second signals corresponding to the first antenna group and the second antenna group.

15. The method according to claim 14, wherein a minimum distance between the first antenna group and the second antenna group is longer than a half wavelength of the broadcast signal.

16. The method according to claim 14, wherein the first antenna group is located at a place where a receiving electric field is weaker than a receiving electric field of a place for the second antenna group.

* * * * *